(12) United States Patent
Ohishi et al.

(10) Patent No.: US 8,339,649 B2
(45) Date of Patent: Dec. 25, 2012

(54) INFORMATION PROCESSING SYSTEM, METHOD AND RECORDING MEDIUM

(75) Inventors: Tsutomu Ohishi, Fukuoka (JP); Hiroyuki Tanaka, Fukuoka (JP); Kazumi Fujisaki, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/051,821

(22) Filed: Mar. 18, 2011

(65) Prior Publication Data
US 2011/0188084 A1 Aug. 4, 2011

Related U.S. Application Data

(63) Continuation of application No. 10/900,098, filed on Jul. 28, 2004, now Pat. No. 7,933,033.

(30) Foreign Application Priority Data

| Jul. 29, 2003 | (JP) | 2003-203078 |
| Jul. 21, 2004 | (JP) | 2004-213188 |
| Jul. 21, 2004 | (JP) | 2004-213189 |
| Jul. 21, 2004 | (JP) | 2004-213190 |

(51) Int. Cl.
*G06K 15/00* (2006.01)
*G06F 3/12* (2006.01)

(52) U.S. Cl. ...... 358/1.16; 358/1.15; 358/1.13
(58) Field of Classification Search ........ 358/1.11–1.18; 709/220; 705/27
See application file for complete search history.

(56) References Cited

U.S. PATENT DOCUMENTS

| 4,977,304 A | 12/1990 | Ino et al. |
| 5,060,071 A | 10/1991 | Ino |
| 5,797,022 A | 8/1998 | Shimotono et al. |
| 6,147,767 A * | 11/2000 | Petteruti et al. ............ 358/1.18 |

(Continued)

FOREIGN PATENT DOCUMENTS

EP 0 863 662 9/1998

(Continued)

OTHER PUBLICATIONS

Hugo Rabson, et al., "Mondo Rescue and Mindi Linux HOWTO Chapter 7. Backup", 'Online!, XP-002321588, http://web.archive.org/web/20030220154318/www.microwerks.net/(hugo/donload/1.6x-howto/backupcommands.html>, pp. 1-2, Mar. 17, 2005.

(Continued)

*Primary Examiner* — Satwant Singh
(74) *Attorney, Agent, or Firm* — Oblon, Spivak, McClelland, Maier & Neustadt, L.L.P.

(57) ABSTRACT

An image forming apparatus that functions as a client of a distributed file system is provided, in which the image forming apparatus includes: a distributed file system process part for mounting a file system of a server apparatus on the image forming apparatus to enable the image forming apparatus to access the file system of the server apparatus as the distributed file system of the image forming apparatus; and a storing process part for accessing the file system of the server apparatus and storing, in the file system, information that is stored in a storage unit used by the image forming apparatus.

12 Claims, 31 Drawing Sheets

U.S. PATENT DOCUMENTS

| | | | |
|---|---|---|---|
| 6,373,585 B1* | 4/2002 | Mastie et al. | 358/1.15 |
| 6,426,800 B1* | 7/2002 | Mizuno et al. | 358/1.15 |
| 6,498,656 B1 | 12/2002 | Mastie et al. | |
| 6,515,756 B1 | 2/2003 | Mastie et al. | |
| 6,650,435 B1* | 11/2003 | Ikeda | 358/1.9 |
| 6,870,634 B1* | 3/2005 | Morikawa | 358/1.16 |
| 6,952,278 B2* | 10/2005 | Miyahara et al. | 358/1.15 |
| 6,961,139 B1* | 11/2005 | Kita et al. | 358/1.15 |
| 7,002,702 B1* | 2/2006 | Machida | 358/1.15 |
| 7,202,962 B2 | 4/2007 | Roosen et al. | |
| RE39,801 E | 8/2007 | Marbry et al. | |
| 7,333,223 B2 | 2/2008 | Gupton et al. | |
| 7,460,253 B2* | 12/2008 | Osada | 358/1.13 |
| 7,511,842 B2 | 3/2009 | Mihira | |
| 7,522,297 B2* | 4/2009 | Egawa et al. | 358/1.14 |
| 7,633,639 B2 | 12/2009 | Ohishi et al. | |
| 7,636,172 B2 | 12/2009 | Akiyoshi et al. | |
| 2001/0028465 A1 | 10/2001 | Sugino | |
| 2002/0114004 A1* | 8/2002 | Ferlitsch | 358/1.15 |
| 2002/0122203 A1 | 9/2002 | Matsuda | |
| 2002/0181804 A1 | 12/2002 | Simpson et al. | |
| 2003/0028753 A1 | 2/2003 | Ohishi | |
| 2003/0069811 A1 | 4/2003 | Ximenes et al. | |
| 2003/0072023 A1 | 4/2003 | Tanaka | |
| 2003/0081742 A1* | 5/2003 | Czyszczewski et al. | 379/93.03 |
| 2003/0115326 A1 | 6/2003 | Verma et al. | |
| 2003/0133136 A1 | 7/2003 | Ohishi et al. | |
| 2003/0140174 A1 | 7/2003 | Ohishi et al. | |
| 2003/0218765 A1 | 11/2003 | Ohishi et al. | |
| 2004/0021890 A1 | 2/2004 | Hirai et al. | |
| 2004/0057067 A1 | 3/2004 | Ohishi et al. | |
| 2004/0057074 A1 | 3/2004 | Ohishi et al. | |
| 2004/0109188 A1 | 6/2004 | Akiyoshi et al. | |
| 2004/0128532 A1 | 7/2004 | Ohishi et al. | |
| 2004/0130747 A1 | 7/2004 | Ohishi et al. | |
| 2004/0184098 A1* | 9/2004 | Niitsuma | 358/1.15 |
| 2006/0075096 A1* | 4/2006 | Ueda et al. | 709/224 |

FOREIGN PATENT DOCUMENTS

| | | |
|---|---|---|
| JP | 8-95760 A | 4/1996 |
| JP | 8-95769 A | 4/1996 |
| JP | 8-95770 A | 4/1996 |
| JP | 8-202607 | 8/1996 |
| JP | 8-223345 | 8/1996 |
| JP | 8-286991 | 11/1996 |
| JP | 8-329102 | 12/1996 |
| JP | 9-102840 | 4/1997 |
| JP | 10-84381 | 3/1998 |
| JP | 11-55488 | 2/1999 |
| JP | 11-144072 | 5/1999 |
| JP | 11-249840 | 9/1999 |
| JP | 2000-89997 | 3/2000 |
| JP | 2000-148651 | 5/2000 |
| JP | 2000-222371 | 8/2000 |
| JP | 2000-324282 | 11/2000 |
| JP | 2001-67278 | 3/2001 |
| JP | 2001-285543 | 10/2001 |
| JP | 2001-296980 | 10/2001 |
| JP | 2001-356928 | 12/2001 |
| JP | 2002-7090 | 1/2002 |
| JP | 2002-84383 | 3/2002 |
| JP | 2002-120438 | 4/2002 |
| JP | 2002-342119 | 11/2002 |
| JP | 2003-92658 | 3/2003 |
| JP | 2003-167715 A | 6/2003 |
| JP | 2003-177949 | 6/2003 |
| JP | 2003-179717 | 6/2003 |

OTHER PUBLICATIONS

Hugo Rabson, et al., "Mondo Rescue and Mindi Linux HOWTO", 'Online!, XP-002321589, http://web.archive.org/web/20021016061828/www.microwerks.net/(hugo/donload/1.6x-howto/>, pp. 1-2, Mar. 17, 2005.

Summons to Oral Proceedings issued Nov. 11, 2010, in European Patent Application No. 04254500.4.

Patent Abstracts of Japan, JP 11-219277, Aug. 10, 1999.

Patent Abstracts of Japan, JP 2001-337801, Dec. 7, 2001.

Erez Strauss, "Linux simple fax printer server mini-HOWTO (faxsrv-mini-HOWTO)", http:// www.ibiblio.org/pub/Linux/docs/HOWTO/other-formats/pdf/Fax-Server.pdf>, vol. 1.0, XP-002329214, Nov. 8, 1997, pp. 1-5.

Adam Thornton, "Enterprise Printing with Linux: Part I—The Basics of Linux and Generic Unix Printing Systems", Technical Support, XP-002329215, Jan. 2001, 3 pages.

Codonics, "LPR and LP", Codonics Technical Briefs, XP-002329216, 1998, 4 pages.

Japanese Office Action issued on May 17, 2011 in corresponding Japanese Application No. 2004-213188.

Office Action issued Sep. 6, 2011 in Japan Application No. 2003-203078.

Office Action issued Feb. 28, 2012, in Japanese Patent Application No. 2010-144361.

* cited by examiner

| Filesystem | 512-blocks | Used | Avail | Capacity | Mounted on |
|---|---|---|---|---|---|
| /dev/wd0s1a | 127134 | 41592 | 75372 | 36% | / |
| /dev/wd0s1e | 1416446 | 904124 | 399008 | 69% | /usr |
| /host_a:/dir1 | 228055876 | 143187484 | 66623924 | 68% | /host_a/dir1 |

HDD:FS FILE

HDD:RAW FILE

FIG.27

| Filesystem | 512-blocks | Used | Avail | Capacity | Mounted on |
|---|---|---|---|---|---|
| /dev/wd0s1a | 127134 | 41592 | 75372 | 36% | / |
| /dev/wd0s1e | 1416446 | 904124 | 399008 | 69% | /usr |
| /host_a:/dir1 | 228055876 | 143187484 | 66623924 | 68% | /host_a/dir1 |

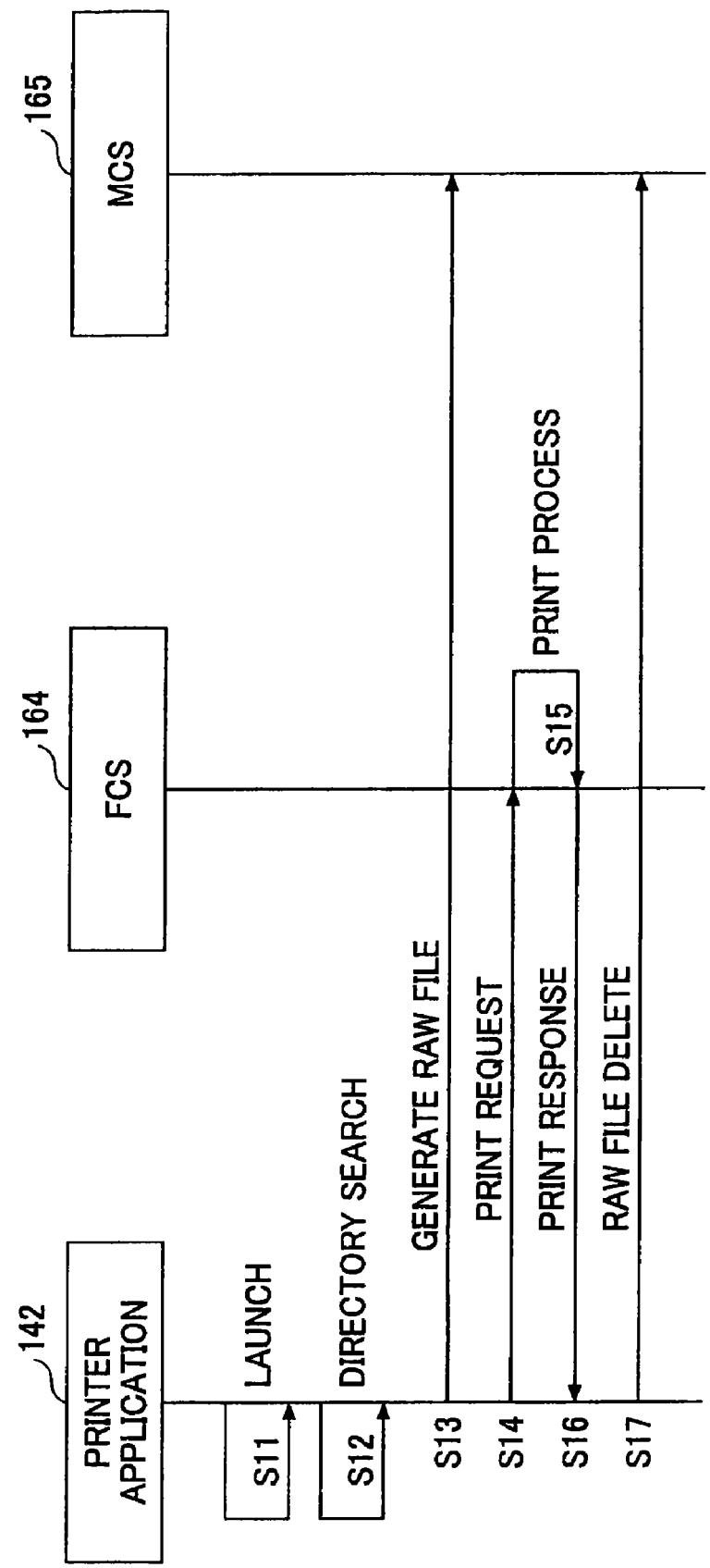

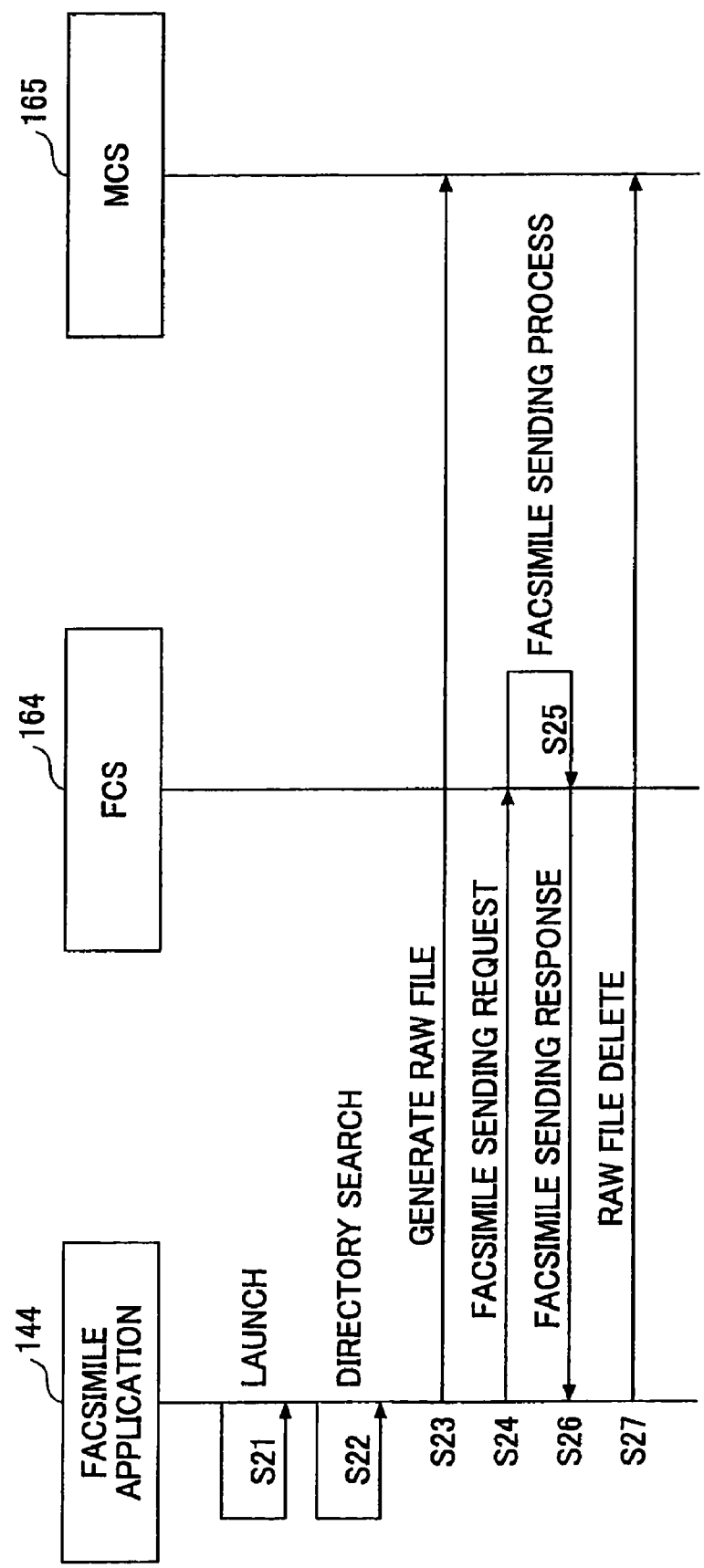

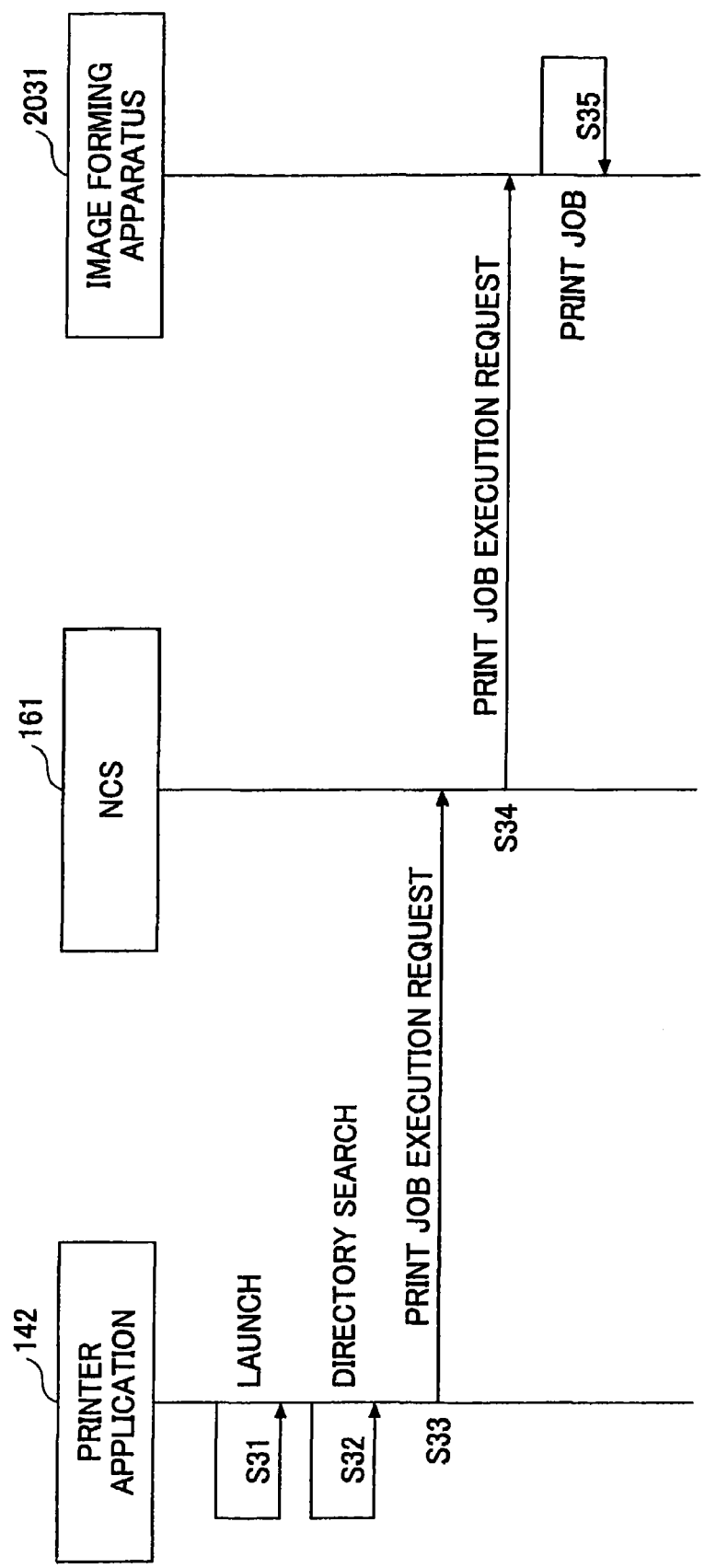

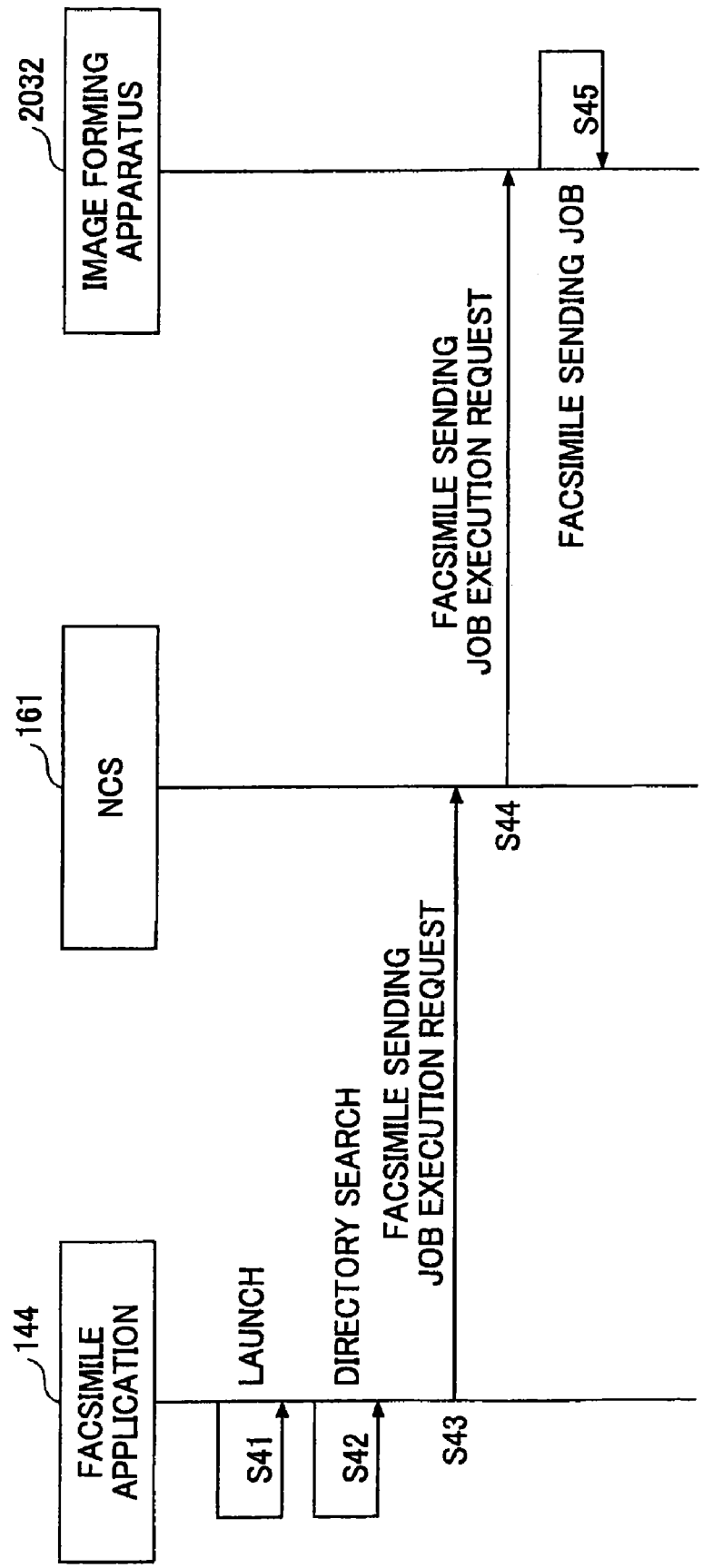

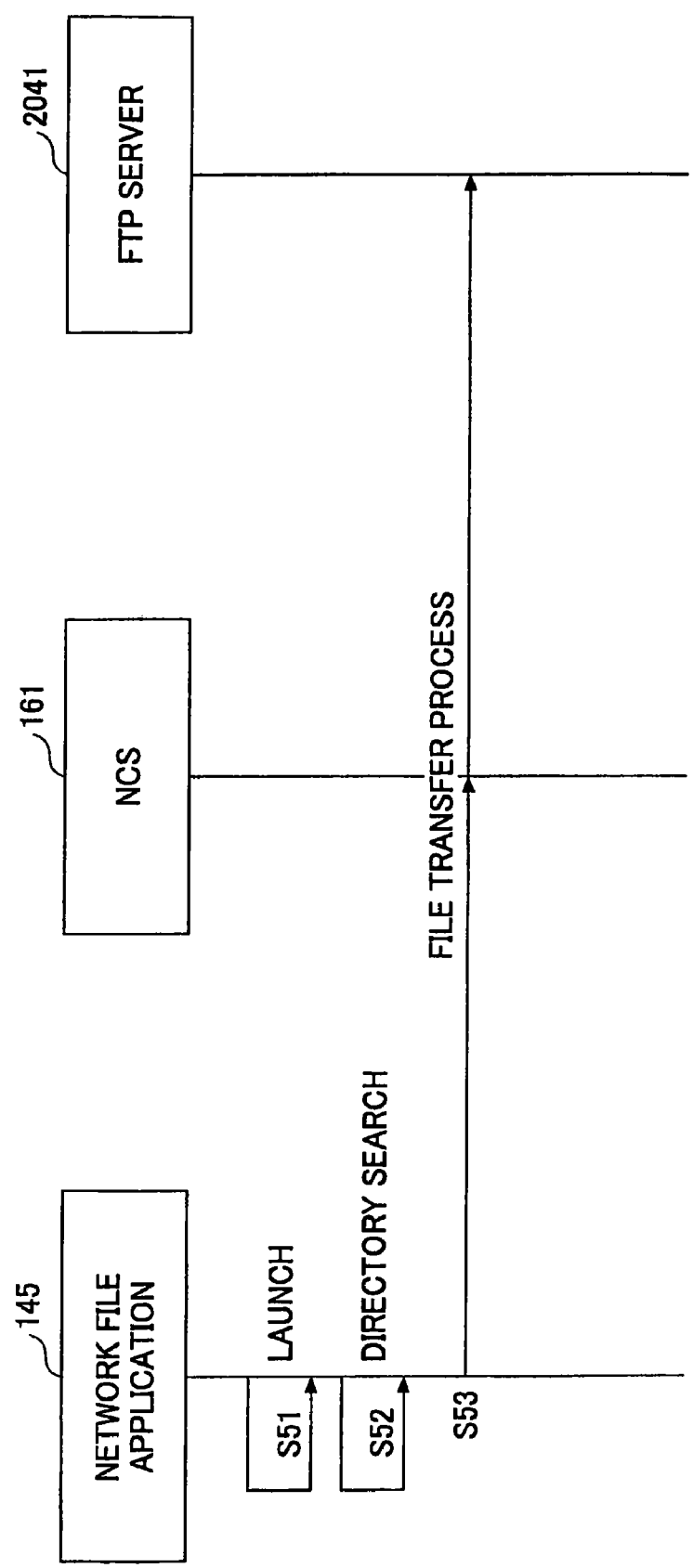

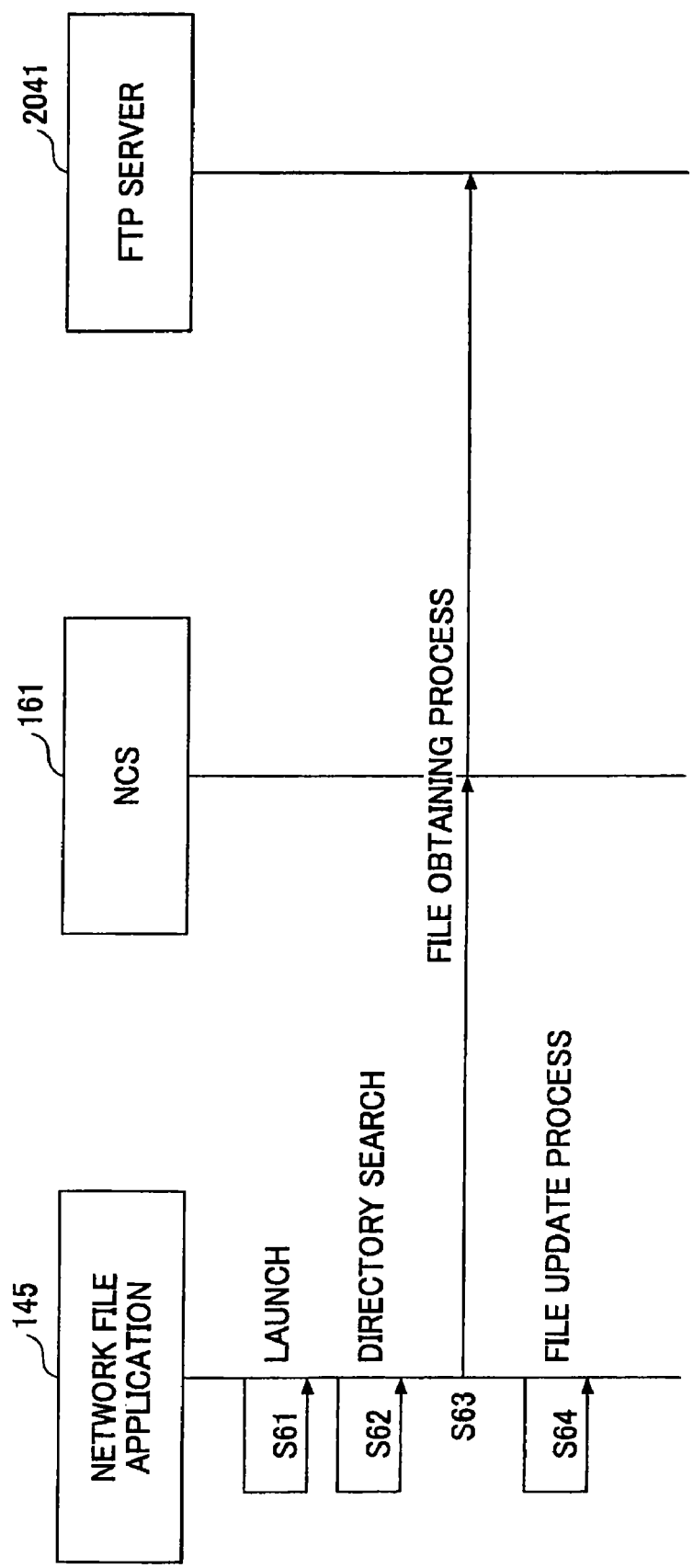

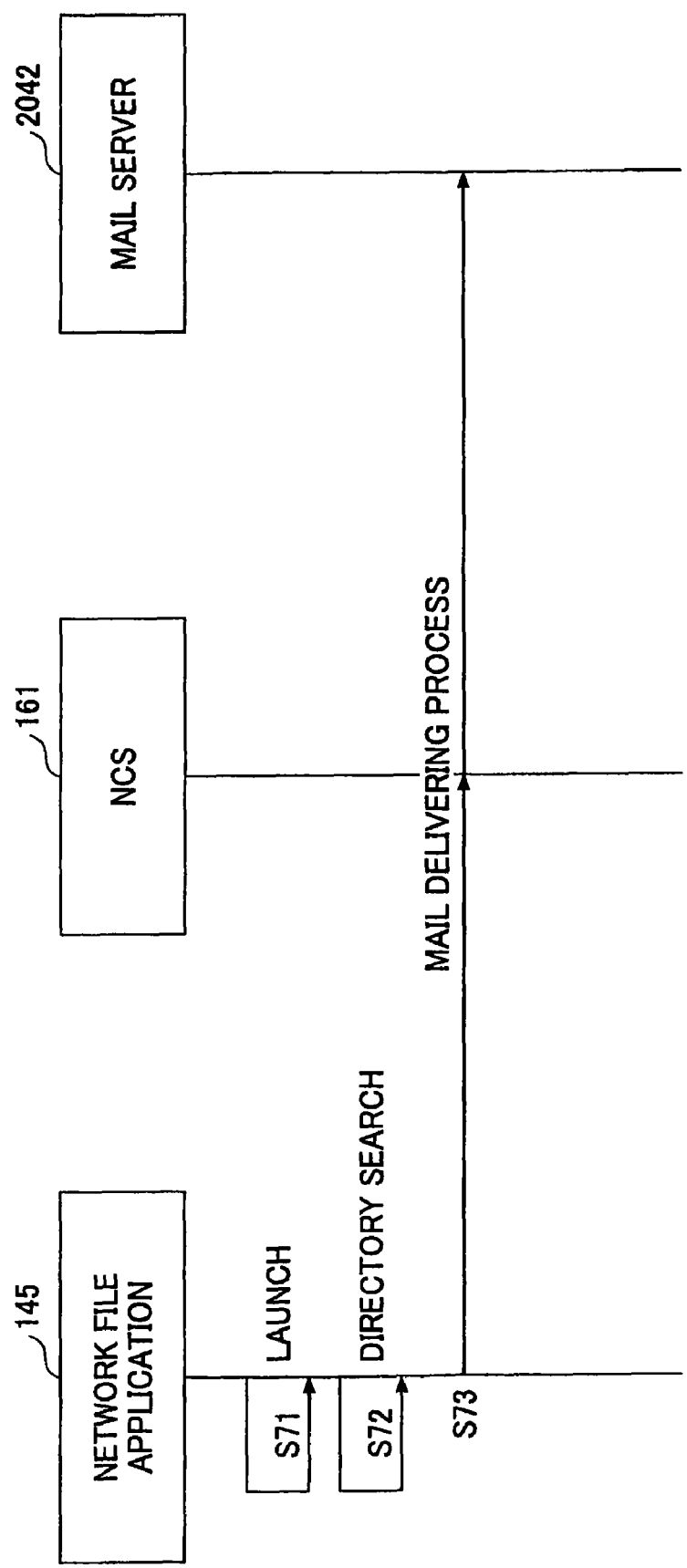

INFORMATION PROCESSING SYSTEM, METHOD AND RECORDING MEDIUM

BACKGROUND OF THE INVENTION

1. Field of the Invention

The present invention relates to an information processing system such as copier/printer/scanner/facsimile/compound machine (to be also referred to as combined machine) and the like, an information processing method, an information processing recording medium such as a CD-ROM.

2. Description of the Related Art

In recent years, a compound machine that includes a copying function, a printer function and a scanner function is coming onto the market. When the compound machine functions as a copier or a printer, an image is to be printed on a printing paper. When the compound machine functions as a copier or a scanner, an image is read from a document. When the compound machine functions as a facsimile, the compound machine receives or sends an image via a telephone line. Japanese laid-open patent application No. 2002-84383 discloses a technology relating to the compound machine.

The compound machine executes various information processing by using various programs such as applications or platforms. For storing information relating to the information processing, various storing means such as a hard disk drive and a memory card provided in the compound machine are used. If a hard disk drive or a memory card of a personal computer or a server computer that is connected to the compound machine can be used in addition to the hard disk drive or the memory card of the compound machine, more preferable execution environment can be realized for the information processing.

In addition, if the hard disk drive or the memory card of the compound machine can be used by a PC (personal computer) connected to the compound machine, more preferable execution environment can be realized for the information processing.

SUMMARY OF THE INVENTION

An object of the present invention is to enable an information processing system to use storage of apparatuses connected thereto as a destination for storing information used for information processing so as to improve environment for executing information processing.

Another object of the present invention is to enable apparatuses connected to the information processing system to use storage thereof to improve the environment for executing information processing.

These objects are achieved by an information processing system comprising a first information processing apparatus configured to perform a first information processing; a second information processing apparatus configured to perform a second information processing; a data storage portion in the second information processing apparatus that can receive and store data from the first information processing apparatus, the data storage portion including a plurality of data storing destinations, each of which corresponds to a specific second information processing process and wherein some of the plurality of data storing destinations correspond to an output destination; a processing portion in the second information processing apparatus, the processing portion configured to perform the specific second information processing corresponding to a selected one of the plurality of data storing destinations, and wherein when the selected one of the plurality of data storing destinations corresponds to an output destination, the data storage portion outputs data to the output destination corresponding to the selected one of the plurality of data storing destinations.

The present invention is also configured as an information processing method comprising the steps of performing a first information processing in a first information processing apparatus; sending data from the first information processing apparatus to a second information processing apparatus having a data storage portion including a plurality of data storing destinations, each of which corresponds to a specific second information processing process, wherein some of the plurality of data storing destinations correspond to an output destination; performing the specific second information processing process corresponding to a selected one of the plurality of data storing destinations using the second information processing apparatus; and outputting, by the data storage portion, data to the output destination corresponding to the selected one of the plurality of data storing destinations when the selected one of the plurality of data storing destinations corresponds to an output destination.

The present invention is also configured as an information processing system comprising an information processing apparatus configured to perform information processing; a data storage portion in the information processing apparatus that can receive and store data from another information processing apparatus, the data storage portion including a plurality of data storing destinations, each of which corresponds to a specific information processing process and wherein some of the plurality of data storing destinations correspond to an output destination; a processing portion in the information processing apparatus, the processing portion configured to perform the specific information processing corresponding to a selected one of the plurality of data storing destinations, and wherein when the selected one of the plurality of data storing destinations corresponds to an output destination, the data storage portion outputs data to the output destination corresponding to the selected one of the plurality of data storing destinations.

In addition, the present invention can be configured as a computer readable medium storing an information processing program for causing an image forming apparatus to perform information processing, comprising first information processing means for performing a first information processing in a first information processing apparatus; data sending means for sending data from the first information processing apparatus to a second information processing apparatus having a data storage portion including a plurality of data storing destinations, each of which corresponds to a specific second information processing process, wherein some of the plurality of data storing destinations correspond to an output destination; second information processing means for performing the specific second information processing process corresponding to a selected one of the plurality of data storing destinations using the second information processing apparatus; and outputting means for outputting, by the data storage portion, data to the output destination corresponding to the selected one of the plurality of data storing destinations when the selected one of the plurality of data storing destinations corresponds to an output destination.

BRIEF DESCRIPTION OF THE DRAWINGS

Other objects, features and advantages of the present invention will become more apparent from the following detailed description when read in conjunction with the accompanying drawings, in which:

FIG. 27 is an example of an output by df command;

FIG. 29 shows a sequence diagram relating to a print process;

FIG. 30 is a sequence diagram relating to a facsimile sending process;

FIG. 31 is a sequence diagram relating to a print process;

FIG. 32 is a sequence diagram relating to a facsimile sending process;

FIG. 33 is a sequence diagram relating to a file transfer process;

FIG. 34 is a sequence diagram relating to a file update process;

FIG. 35 is a sequence diagram relating to a mail delivering process.

DETAILED DESCRIPTION OF THE PREFERRED EMBODIMENTS (First Embodiment)

In the following, the first embodiment of the present invention is described with reference to figures.

Figure 1:
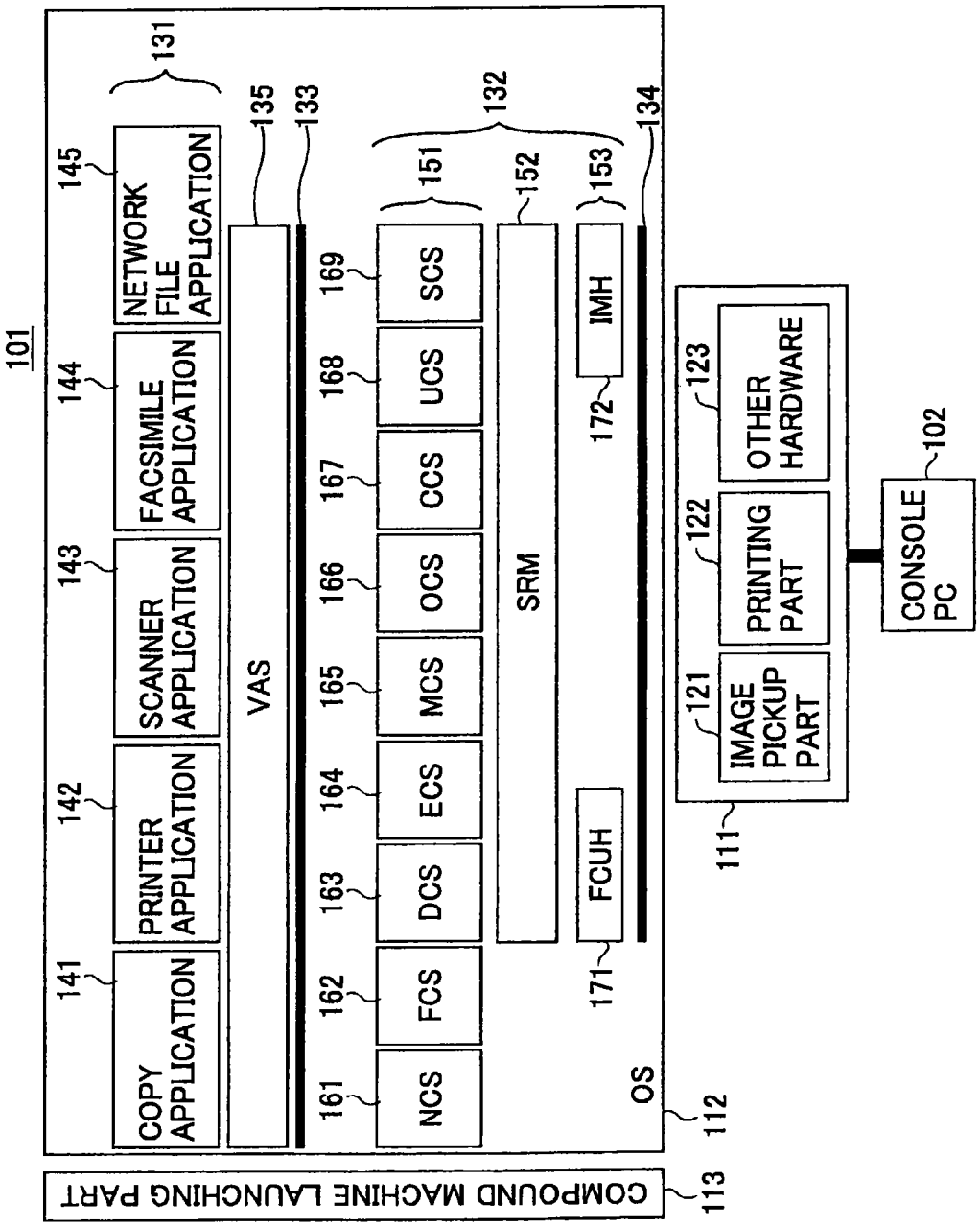
FIG. 1 shows a compound machine of an embodiment of the present invention.

FIG. 1 shows a compound machine 101 of the embodiment of the present invention. The compound machine 101 shown in FIG. 1 includes various hardware 111, various software 112 and a compound machine launching part 113.

The hardware 111 of the compound machine 101 includes an image pickup part 121, a printing part 122, and other hardware 123. The image pickup part 121 is hardware for reading an image (image data) from a document. The printing part 122 is hardware for printing the image on a printing paper.

The software 112 of the compound machine 101 includes various applications 131 and various platforms 132. These programs are executed in parallel as processes by an OS (operating system) such as UNIX.

The application 131 includes a copy application 141 that is an application for copying, a printer application 142 that is an application for printing, a scanner application 143 that is an application for scanning, a facsimile application 144 that is an application for facsimile, and a network file application 145 that is an application for network file.

An application can be developed by using a dedicated SDK (software development kit). An application developed by using the SDK is called a SDK application. The SDK includes executable files of the platform 132, a dedicated function library of the platform 132, a C language standard function library, a compiler for compiling a source file of the application 131 to generate an object file of the application 131, and a linker for linking the object file with the dedicated function library and the standard function library to generate an executable file of the application. The compiler of the SDK includes an optional function (debug option) for adding a tag that is a detection code for debugging at an entry or at an exit of a function in a source code. When a SDK application to which the tag is added is launched in the compound machine 101, a console PC 102 that is connected to the compound machine 101 displays a variable value, a function argument, or a function return value with a message. By displaying such information, the user can efficiently perform debugging of the SDK application.

The platform 132 includes control services 151, a system resource manager 152, and handlers 153. The control services 151 include a network control service (NCS) 161, a facsimile control service (FCS) 162, a delivery control service (DCS) 163, an engine control service (ECS) 164, a memory control service (MCS) 165, an operation panel control service (OCS) 166, a certification control service (CCS) 167, a user directory control service (UCS) 168, and a system control service (SCS) 169. The handlers 153 include a facsimile control unit handler (FCUH) 171 and an image memory handler (IMH) 172.

The process of the NCS 161 intermediates network communications. The process of FCS 162 provides APIs for facsimile. The process of DCS 163 controls delivery processes of stored documents. The process of ECS 164 performs control for the image pickup part 121 or the printing part 122. The process of MCS 165 performs control foe the memory and the hard disk drive. The process of the OCS 166 performs control of the operation panel. The process of CCS 167 performs control for authentication process and billing process. The process of the UCS 168 performs control relating to management of user information. The process of the SCS 169 performs control of management of the system.

A virtual application service (VAS) 135 exists as software for performing mediation between the application 131 and the platform 132. The VAS 135 operates as a server process for each application that functions as a client, and operates as a client process for the platform that functions as a server. The VAS 135 has a wrapping function for hiding the platform 132 from the application 131. In addition, the VAS has a function for absorbing version differences between the platforms 132 and APIs of the applications.

The compound machine launch part 113 is executed first when the power is turned on. Accordingly, the OS such as UNIX is launched, and the applications 131 and the platform 132 are launched. These programs are stored on the hard disk drive or in the memory card, and are read from the hard disk drive or from the memory card, and are loaded into a memory.

Figure 2:
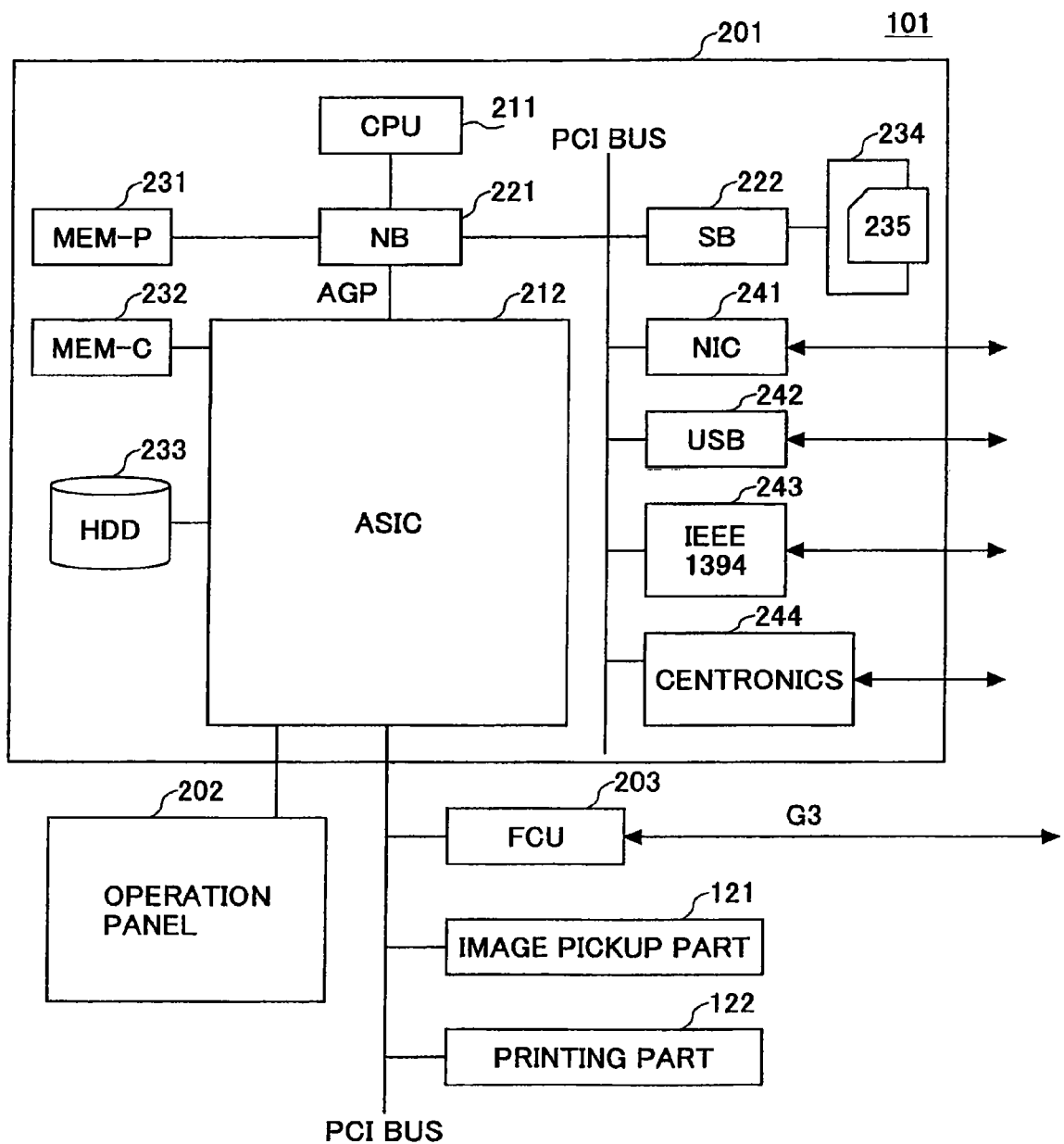
FIG. 2 is a hardware block diagram of the compound machine of FIG. 1.

FIG. 2 is a hardware block diagram of the compound machine 101 shown in FIG. 1. The hardware 111 of the compound machine 101 includes a controller 201, an operation panel 202, a facsimile control unit (FCU) 203, an image pickup part 121 and a printing part 122.

The controller 201 includes a CPU 211, an ASIC 212, a NB 221, a SB 222, a MEM-P 231, a MEM-C 232, a HDD (hard disk drive) 233, a memory card slot 234, a NIC (network interface controller) 241, a USB device 242, an IEEE 1394 device 243 and a Centronics device 244.

The CPU 211 is an IC for various information processing. The ASIC 212 is an IC for various image processing. The NB 221 is a north bridge for the controller 201. The SB 222 is a south bridge for the controller 201. The MEM-P 231 is a system memory for the compound machine 101. The MEM-C 232 is a local memory of the compound machine 101. The HDD 233 is a storage of the compound machine 101. The memory card slot 234 is a slot for setting the memory card 235. The NIC 241 is a controller for network communications by MAC addresses. The USB device 242 is a device for providing connection terminals of IEEE 1394 standard. The Centronics device 244 is a device for providing connection terminals of Centronics.

The operation panel 202 is hardware (operation part) by which the user inputs data into the compound machine 101, and also hardware (display part) for obtaining output data from the compound machine 101.

Figure 3:
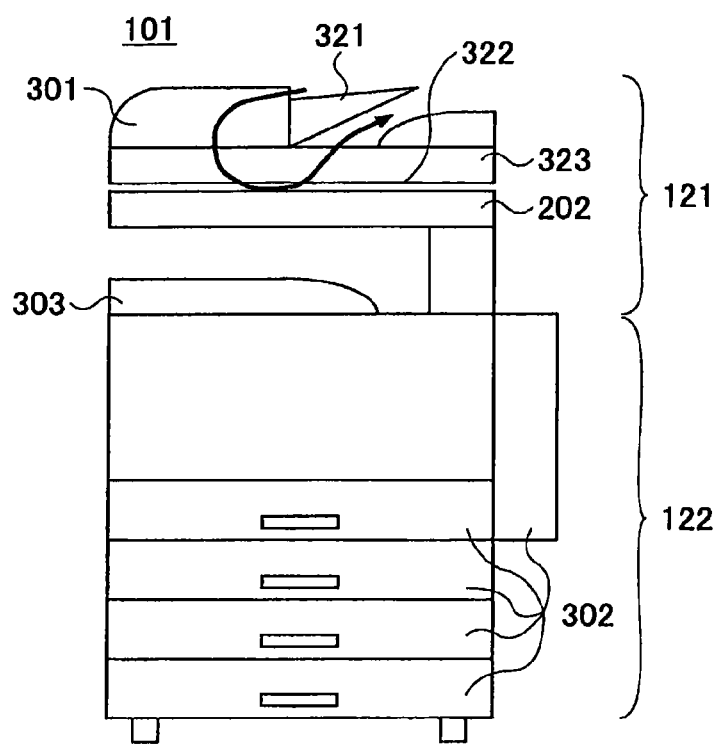
FIG. 3 is an external view of the compound machine of FIG. 1.

FIG. 3 is an external view of the compound machine 101 of FIG. 1. FIG. 3 shows a position of the image pickup part 121, a position of the printing part 122 and a position of the operation panel 202. FIG. 3 further shows a document setting part 301 on which the documents are set, a paper feed part 302 for feeding papers, and a paper ejecting part 303 for ejecting a printing paper.

Figure 4:
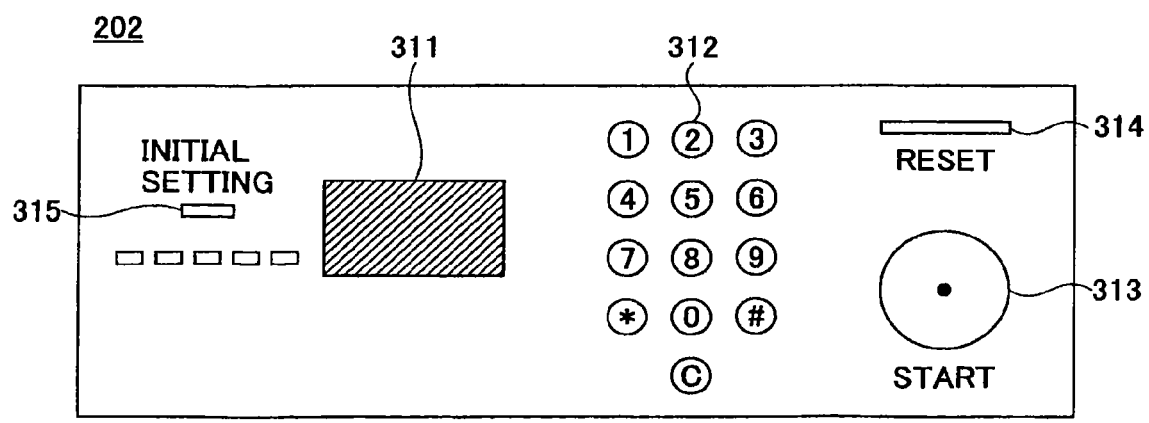
FIG. 4 shows an operation panel.

As shown in FIG. 4, the operation panel 202 includes a touch panel 311, ten keys 312, a start button 313, a reset button 314, an initial setting button 315. The touch panel 311 is hardware (touch operation part) for inputting data by touch operation, and is also hardware (image display part) for displaying image. The ten keys 312 are hardware for input numbers by key operations. The start button 313 is hardware for performing start operation by button operation. The reset button 314 is hardware for performing reset operation by button operation. The initial setting button 315 is hardware for displaying an initial setting screen by button operation.

The document setting part 301 includes an ADF (automatic document feeder) 321, a flat bed 322, and a flat bet cover 323. The paper feeding part 302 includes four feeding trays. The paper ejecting part 303 includes one ejecting tray.

(Compound Machine Launch Part)

In the following, the compound machine launch part 113 of FIG. 1 is described.

Figure 5:
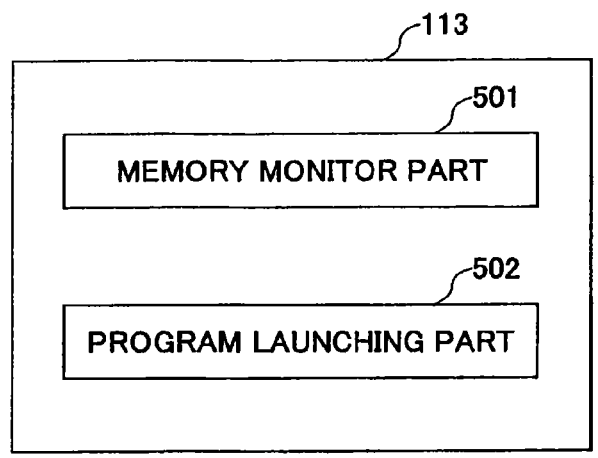
FIG. 5 shows a compound machine launching part.

As shown in FIG. 5, the compound machine launch part 113 includes a memory monitoring part 501 an a program launch part 502.

When the power of the compound machine 101 is turned on, BIOS and boot loader that form the memory monitoring part 501 are launched, so that the OS that is the UNIX is launched. Next, a launch processing program that forms the program launch part 502 is launched, so that the applications and the platform 132 are launched. When the UNIX is launched, a kernel of the UNIX is launched, a root file system is unfolded, so that file systems relating to the applications and the platform are mounted on the root system file.

(Memory Card)

In the following, the memory card slot 234 and the memory card 235 are described. The memory card slot 234 is a slot to which the memory card 235 is inserted, in which the memory card 235 stores programs such the applications 131 or the platform 132. The programs stored in the memory card 235 are read and loaded in the MEM-P 231 or the MEM-C 232.

As the memory card 235, an SD (Secure Digital) memory card that is a kind of a flash memory card is used. By using the SD memory card, there is a merit in that large capacity memories can be used at a low cost. For the SD memory card, a SD memory card slot is used as the memory card slot 234.

Figure 6:
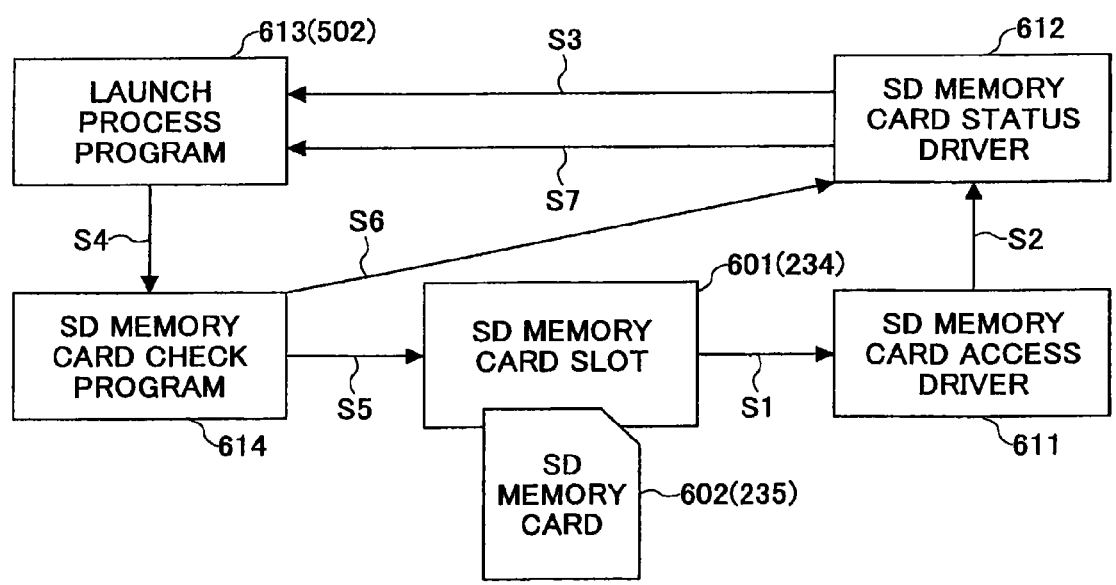
FIG. 6 shows a configuration of software relating to a SD memory card slot and a SD memory card.

As shown in FIG. 6, the compound machine 101 includes a SD memory card access driver (SD access) 611, a SD memory card status driver (SD status) 612, a launch processing program 613, and a SD memory cad check program (SD check) 614 as software relating to the SD memory card slot 601 and the SD memory card 602 (corresponding to memory card slot 234 and memory card 235).

SD access 611 is a driver for performing access control for the SD memory card 602. More specifically, the SD access 611 detects insert/eject of the SD memory card 602, for example. SD status 612 is a driver for managing information of insert/eject/mount/unmount for the SD memory card. The launch processing program 613 is a program forming the program launch part 502 of FIG. 5. The SD check 614 is a program for performing mount/unmount of the SD memory card 602.

When the SD memory card 602 is inserted into the SD memory card slot 601, the SD access 611 detects that the SD memory card 602 is inserted in step 1, and SD access 611 notifies the SD status 612 of it in step 2. In response to that, the SD status 612 manages information that indicates that the SD memory card 602 has been inserted, and notifies the launch processing program 613 that the SD memory card 602 has been inserted in step 3. In response to that, the launch processing program 613 launches the SD check 614 to mount the SD memory card 602. In response to that, the SD check 614 mounts the SD memory card 602 in step 5, and notifies the SD status 612 of it in step 6. In response to that, the SD status 612 manages information indicating that the SD memory card 602 is mounted, and notifies the launch processing program 613 that the SD memory card 602 has been mounted in step 7.

When the SD memory card 602 is pulled out from the SD memory card slot 601, the SD access 611 detects that the SD memory card 602 has been pulled out in step 1, and SD access 611 notifies the SD status 612 that the SD memory card 602 has been pulled out in step 2. In response to that, the SD status 612 manages information that indicates that the SD memory card 602 has been pulled out, and notifies the launch processing program 613 that that the SD memory card 602 has been pulled out in step 3. In response to that, the launch processing program 613 launches the SD check 614 to unmount the SD memory card 602 in step 4. In response to that, the SD check 614 unmounts the SD memory card 602 in step 5, and notifies the SD status 612 of it in step 6. In response to that, the SD status 612 manages information indicating that the SD memory card 602 is unmounted, and notifies the launch processing program 613 that the SD memory card 602 has been unmounted in step 7.

By adopting the SD memory card, so-called hot insertion and removal of the card can be realized. That is, an operation for inserting the SD memory card 602 into the SD memory card slot 601 and an operation for removing the SD memory card 602 from the SD memory card slot 601 can be performed after the compound machine 101 is launched.

(NFS)

In the following, an information processing system of FIG. 7 including the compound machine 101 shown in FIG. 1 is described. The information processing system shown in FIG. 7 includes the compound machine 101 and a server computer 701. The compound machine 101 and the server computer 701 are connected by a LAN (local area network) 702. The LAN 702 is constituted by the Ethernet in this example.

The compound machine 101 of FIG. 1 performs various information processes by using various programs such as the applications 131 and the platforms 132. In the information processing system of FIG. 7, not only the HDD 233 and the SD memory card 602 of the compound machine 101 but also a HDD 703 and a SD memory card 705 of the server computer 701 can be used as a storing destination of information relating to various information processes performed by the compound machine 101.

To realize this configuration, NFS (network file system) that is one of technologies for realizing a distributed file system is used in this embodiment. A file system in the HDD 703 in the server computer 701 can be used as a distributed file system of the compound machine 101. In the information processing system of FIG. 7, a file system of the server computer 701 is used as a storing destination of information relating to information processing by the compound machine 101.

UNIX that is the OS 706 is installed in the HDD 703 of the server computer 701. The server computer 701 functions as a server (NFS server) of NFS. The OS (UNIX) is also installed in the HDD 233 in the compound machine 101. The compound machine 101 is connected to the server computer 701 via the network, so that the compound machine 101 functions as a client (NSF client) of NFS. Accordingly, information processing of NFS such as "vfs (virtual file system) operation", "v-node(virtual node) operation" can be performed by the UNIX in the server 701 and in the compound machine 101.

Network protocols used for network communications in NFS between the compound machine 101 and the server computer 701 are IP as a network (third) layer protocol in the OSI reference model, UDP as a transport (fourth) layer protocol, RPC as a session (fifth) layer protocol, and XDR as a presentation (sixth) layer protocol. Although TCP may be used as the transport (fourth) layer protocol, UDP is used in this embodiment in consideration of speed rather than reliability.

As a technology for realizing the distributed file system, "samba" may be used instead of NFS. In this case, Windows is installed in the HDD 703 in the server computer 701 as the OS 706, so that the server computer 701 functions as a server (samba server) of samba. UNIX is installed in the HDD 233 of the compound machine 101, and the compound machine 101 functions as a client (samba client) of samba. By using samba, the UNIX machine can use a shared folder of a Windows machine.

Network protocols for performing network communications in samba between the compound machine 101 and the server computer 701 are IP as the third layer, TCP as the fourth layer, NETBIOS as the fifth layer, SMB as the sixth layer, and samba as the seventh layer. Alternatively, NetBEUI can be used as the third and fourth layers, and NETBIOS can be used as the fifth layer. Further alternatively, IPX can be used as the third layer, and SPX can be used as the fourth and fifth layers. Since SMB supports the folder sharing function and the file sharing function of Windows, the samba server can be called as a SMB server and the samba client can be called as a SMB client.

As mentioned above, although either of NFS or samba or other technologies can be used for realizing the distributed file system, NFS is used in the following example for the sake of explanation.

Figure 8:
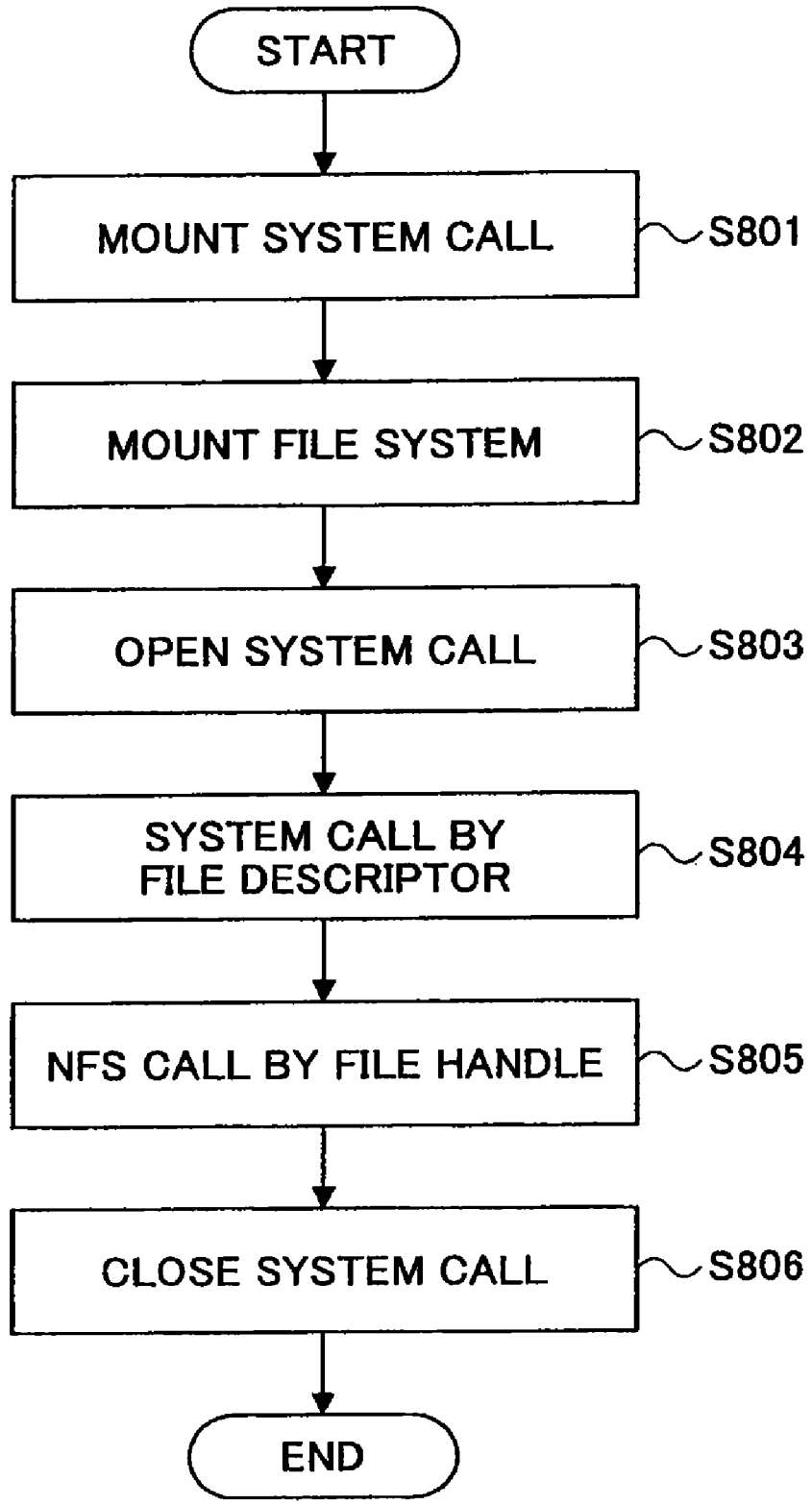
FIG. 8 is a flowchart for explaining information processing in NFS.

By referring to FIG. 8, information processing performed by the compound machine 101 in a case where an application in the compound machine 101 accesses a file in a file system in the server computer 701 is described.

When the application in the compound machine 101 accesses a file in the file system of the server computer 701, the application issues a mount system call for the file system of the server computer 701 in step 801. In response to that, the OS 136 of the compound machine 101 mounts the file system of the server computer 701 on the compound machine 101 in step 802, so that the file system of the server computer 701 is accessible as a distributed file system of the compound machine 101.

Next, the application of the compound machine 101 accesses the file system as the distributed file system of the compound machine 101 so as to access the file.

When the application starts to access the file, the application issues an open system call to the file in step 803. When the application ends to access the file, the application issues a close system call to the file in step 806. By performing the open system call, the application obtains a file descriptor of the file and the OS 136 obtains a file handle of the file.

When the application accesses the file, the application issues a system call by using the file descriptor in step 804. In response to that, the OS 136 of the compound machine 101 sends a system call of the file descriptor (that is a NFS call of the file handle) to the OS 706 of the server computer 701 in step 805. When the OS 706 of the server computer 701 receives the NFS call, the OS 706 executes a command in the NFS call.

Figures 9, 10:
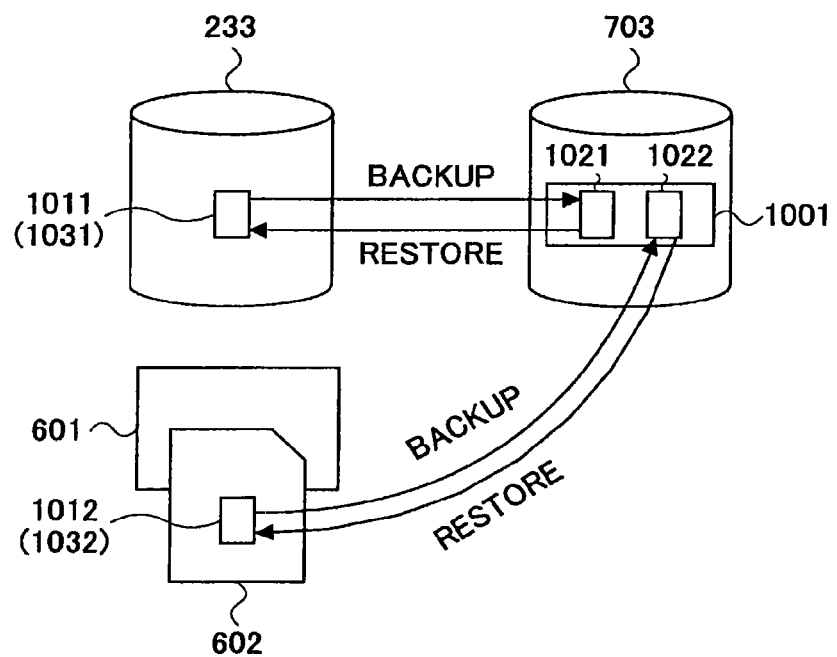
FIG. 9 shows an example of an output by df command.
FIG. 10 is a figure for explaining a first example of usage of NFS.

The file system of the compound machine is described with reference to FIG. 9. In UNIX, the storage area in the HDD is divided into a plurality of partitions. Usually, in UNIX, partitions from "a" to "h" exist. The partition "a" is a root file system "/", "b" is SWAP, "c" is a whole area, partitions from "d" to "h" are file systems such as "/user" and the like. FIG. 9 is an example of information on the file system of the compound machine 101 that is displayed by a df command of the OS 136 (UNIX). FIG. 9 shows that "a" in the HDD 233 is mounted on "/", "e" is mounted on "/user". In addition, FIG. 9 shows that "/dir1" that is a directory (file system) of the server computer 701 "host_a" is mounted on "/host_a/dir1" that is a directory (mount point) of the compound machine 101.

In the following, a mount process and an unmount process are described in the following, in which the mount process is performed for mounting the file system of the server computer 701 on the compound machine 101 and the unmount process is performed for unmounting the file system of the computer 701 from the compound machine 101.

In the processes of steps 801 and 802 in FIG. 8, when the application needs to access the file system, in response to the system call by the application, the OS 136 performs mount of the file system. When the application does not need to access the file system, in response to the system call by the application, the OS 136 performs unmount of the file system. According to necessity for accessing the file system of the server computer 701, mount or unmount for the file system of the server computer 701 is performed.

The possibility that the compound machine 101 may be affected due to a trouble of the server computer 701 can be reduced by unmounting the file system from the server computer 701 when it is not necessary to access the file system of the server computer 701.

Instead of performing mount of the file system by using the mount system call of the application, automount of the OS 136 can be used.

Alternatively, the file system may continue to be mounted on the compound machine 101 while the compound machine 101 is being operated. In this case, a setting file relating to the mount processing is prepared in the HDD 233 or in the SD memory card 602, so that the OS 136 executes the mount of the system file in response to a system call by the launch processing program at the time when the power of the compound machine 101 is turned on.

Figure 7:
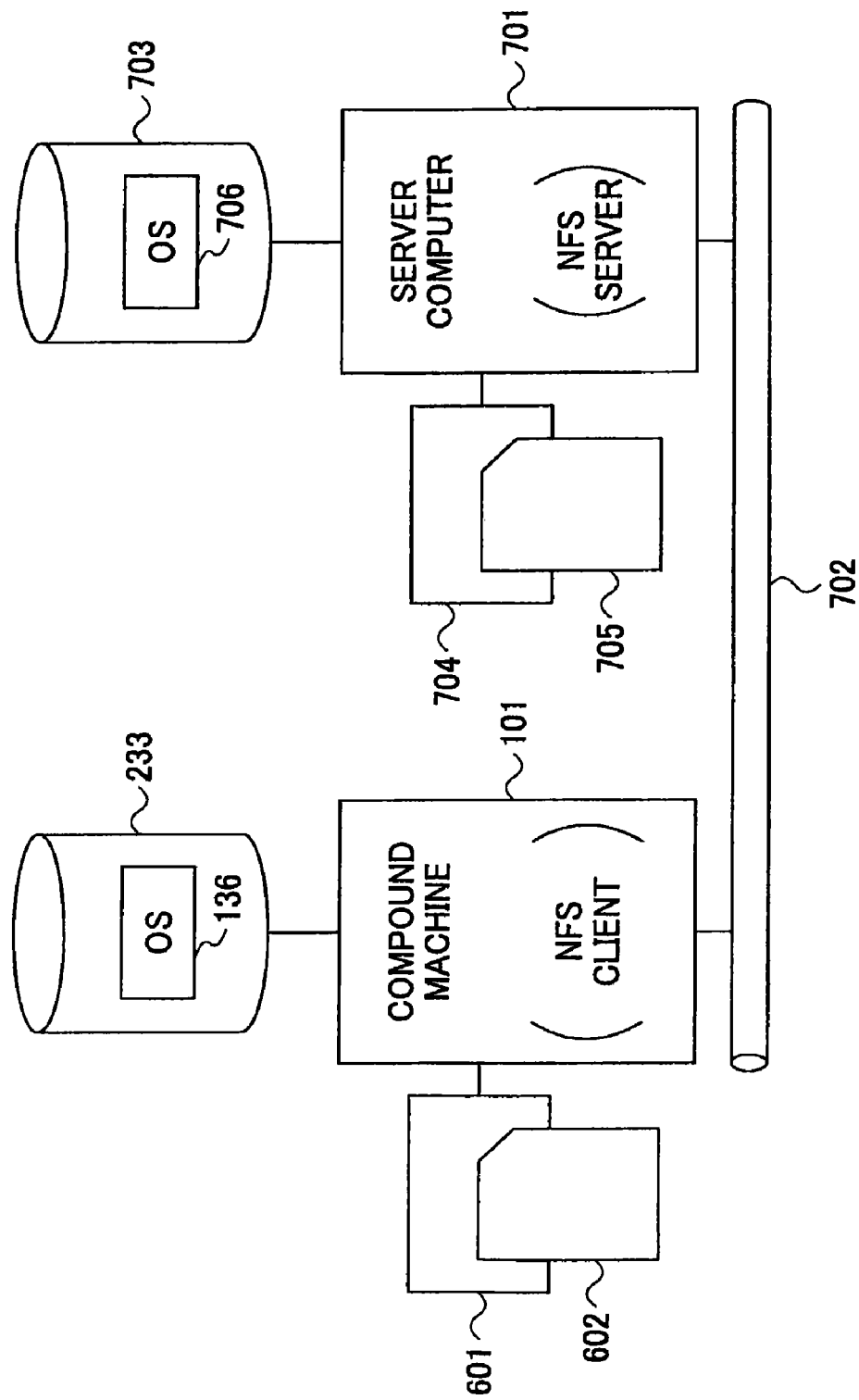
FIG. 7 shows an information processing system using NFS.

As mentioned above, in the information processing system of FIG. 7, NFS (network file system) that is one of technologies for realizing the distributed file system can be used. In the following, examples of usage of NFS in the information processing system of FIG. 7 are described in more detail.

(1) First Example

FIG. 10 is a figure for explaining a first example of the usage of NFS. In the first example, the HDD 703 in the server computer 701 is used as a backup destination (restore source) of stored information in the HDD 233 or the SD memory card 602 of the compound machine 101.

The information processing of the first example is performed by the MCS 165 (refer to FIG. 1). That is, the MCS 165 accesses a file system 1001 in the HDD 703 as a distributed file system of the compound machine 101, and stores backup files 1021 and 1022 of the files 1011 and 1012 into the file system 1001, wherein the files 1011 and 1012 are information stored in the HDD 233 or the SD memory card 602. Further, the MCS 165 accesses the file system in the HDD 703 as the distributed file system of the compound machine 101, so that the MCS 165 restores the backup information into the HDD 233 or the SD memory card 602 from the backup files 1021 and 1022.

The backup process or the restore process can be performed by the MCS 165 when a "backup button" or a "list button" is touched on a screen displayed on the touch panel 311 by the application. Instead of such a local operation by the touch panel 311, the operation of the backup can be performed remotely from a terminal. The above-mentioned "backup process" can be automatically performed by the MCS 165 periodically, for example, once a week. Instead of performing the backup process by the MCS 165, another program that is launched periodically may automatically perform the backup process.

Data in the file stored in the HDD 233 or the SD memory card 602 may be image data or may be user information. The image data may be obtained by scanning a document by the image pickup part 121, or may be data to be printed by the printing part 122. The user information may be authentication information of users, billing information, resource use restriction information, scanner destinations, facsimile destinations or the like. The backup target can be other files.

An example of a merit of the first embodiment is that data can be protected even when an failure of the HDD 233 or the SD memory card occurs. Especially, since UNIX is used in this embodiment, there is a merit in adopting the first example.

(2) Second Example

Figure 11:
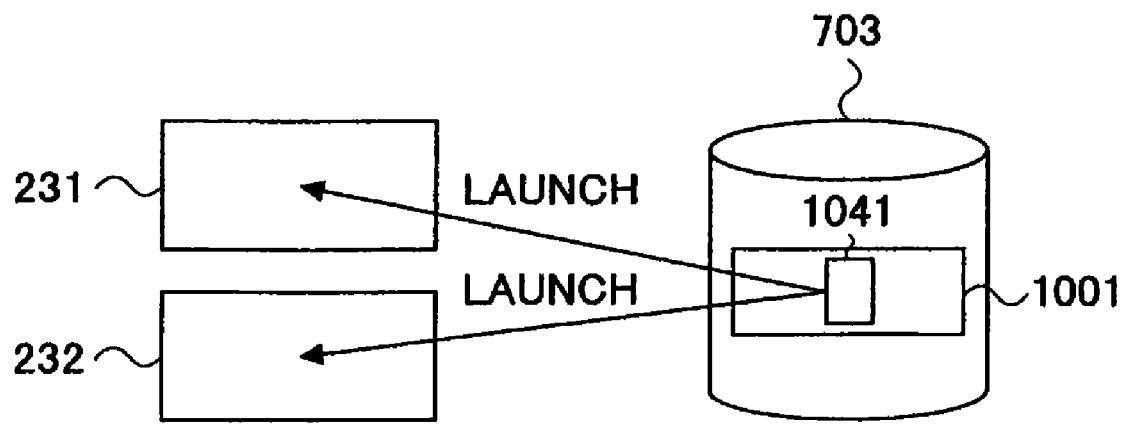
FIG. 11 is a figure for explaining a second example of usage of NFS.

FIG. 11 is a figure for explaining a second example of the usage of NFS. In the second example, the HDD 703 in the server computer 701 is used as a storing destination of a SDK application file 1041 that includes a SDK application. The SDK application stored in the SDK application file 1041 is restored from the HDD 703 and launched in the compound machine 101. The SDK application file 1041 is an executable file of the SDK application.

The launch processing program that corresponds to the program launch part 502 performs the information processing of the second example. That is, the launch processing program accesses the file system in the HDD 703 as a distributed file system of the compound machine 101, so that the program loads the SDK application stored in the file system 1001 into the MEM-P 231 or the MEM-C 232.

(3) Third Example

Figure 12:
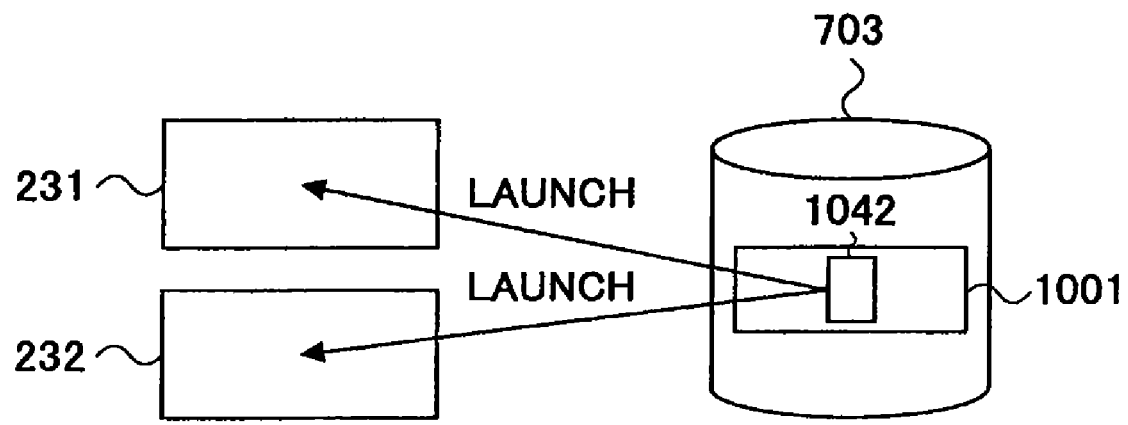
FIG. 12 is a figure for explaining a third example of usage of NFS.

FIG. 12 is a figure for explaining a third example of usage of NFS. In the third example, the HDD 703 is used as a storing destination of a SDK application file 1042 that includes a SDK application to which the tag which is the detection code for debugging is attached. The SDK application stored in the SDK application file 1042 is restored from the HDD 703 and launched in the compound machine 101. The SDK application file 1042 is an executable file of the SDK application.

In the third example, the launch processing program that corresponds to the program launch part 502 performs the information processing. That is, the launch processing program accesses the file system in the HDD 703 as a distributed file system of the compound machine 101, so that the program loads the SDK application stored in the file system 1001 into the MEM-P 231 or the MEM-C 232.

When the SDK application to which the tag is added is launched in the compound machine 101 as a debugging target, a console PC 102 connected to the compound machine 101 displays variable values, function arguments, or function return values with a message. Accordingly, debugging for the SDK application can be efficiently performed. The HDD 703 in the server computer 701 may store telnetd, ftpd, emacs, mule, gdb and the like. In the case where the server computer 701 stores telnetd, ftpd, emacs, mule, gdb and the like, by performing romboot instead of netboot in the compound machine 101 and by performing REMOTElogin by usinf telnet and the like from a terminal and the like, the debugging of the SDK application can be performed more efficiently.

(4) Fourth Example

Figure 13:
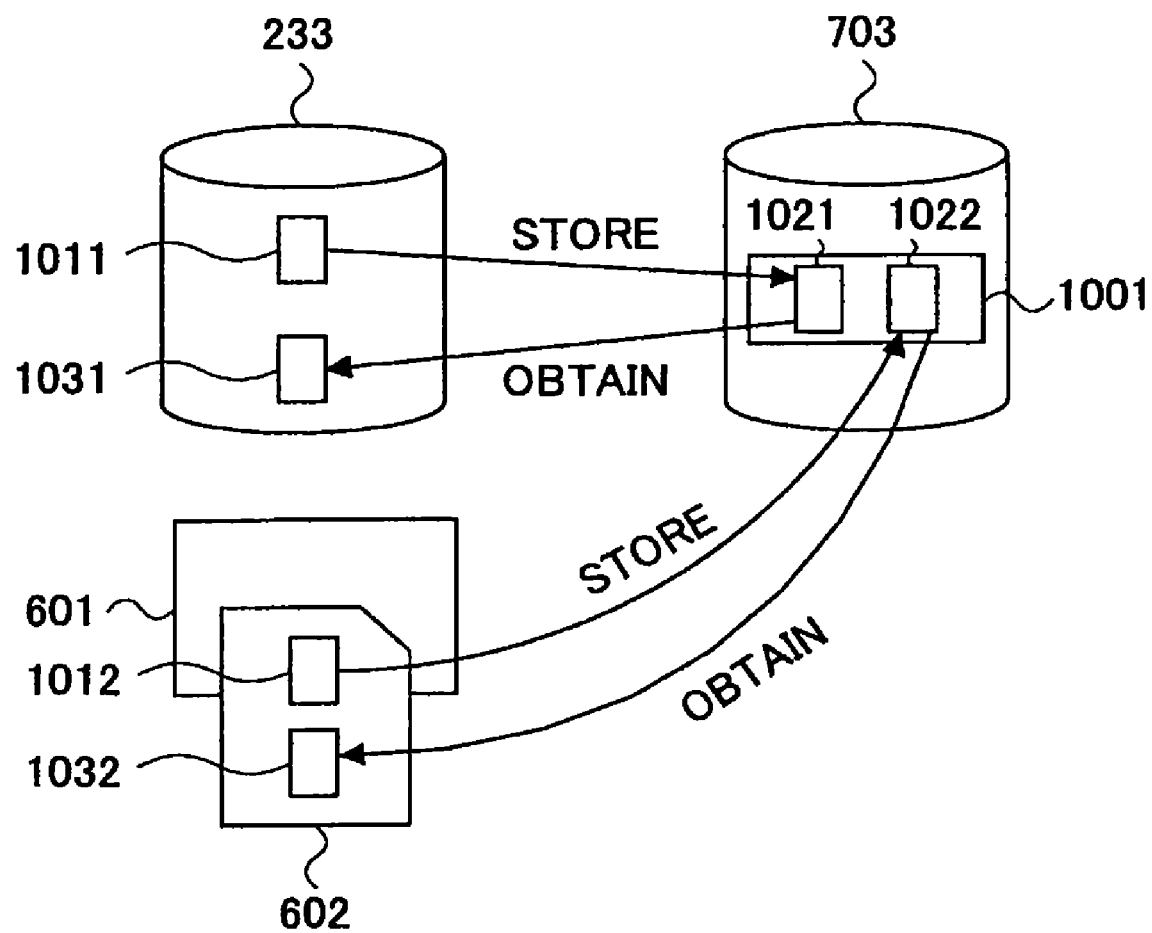
FIG. 13 is a figure for explaining a fourth example of usage of NFS.

FIG. 13 is a figure for explaining a fourth example of usage of NFS. In the fourth example, the HDD 703 in the server computer 701 is used as a storing destination (obtaining source) of stored information in the HDD 233 or the SD memory card 602 of the compound machine 101. The first example and the fourth example are different in that the HDD 703 is used as a normal storing destination (obtaining source) in this example.

The information processing of the fourth example is performed by the MCS 165 (refer to FIG. 1). That is, the MCS 165 accesses a file system 1001 in the HDD 703 as a distributed file system of the compound machine 101, and stores files 1011 and 1012 in the file system 1001 as files 1021 and 1022, wherein the files 1011 and 1012 are originally stored information in the HDD 233 or the SD memory card 602. Further, the MCS 165 accesses the file system 1001 in the HDD 703, so that the MCS 165 obtains data into the HDD 233 or the SD memory card 602 from the files 1021 and 1022 as files 1031 and 1032.

Data in the file stored in the HDD 233 or the SD memory card 602 may be image data or may be user information. The image data may be obtained by scanning a document by the image pickup part 121, or may be data that can be printed by the printing part 122. The user information may be authentication information of users, billing information, resource use restriction information, scanner destinations, facsimile destinations or the like. The storing target can be other files.

An example of a merit of the fourth embodiment is that apparatuses can share information. For example, scanned data in a compound machine can be used as print data in another compound machine. In addition, image data obtained by a compound machine can be browsed by a terminal. Further, a scanned data sending destination or a facsimile sending destination stored in a compound machine can be obtained by another compound machine, or user information stored in a compound machine can be edited in a terminal.

(5) Image Data

Figure 14B:
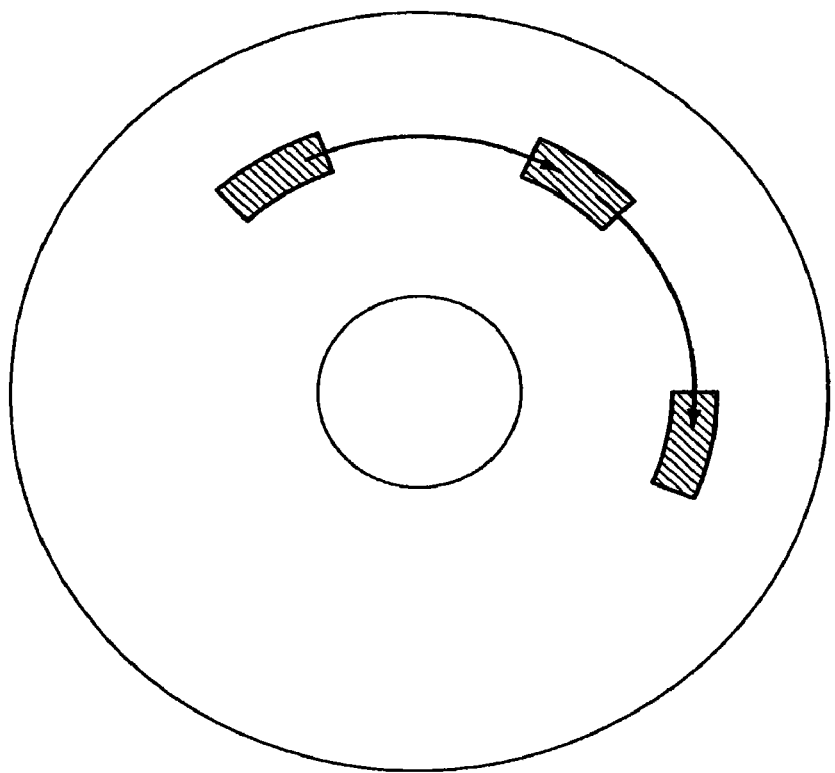
FIGS. 14A and 14B are figures for explaining formats of data stored in a HDD.
Figure 14A:
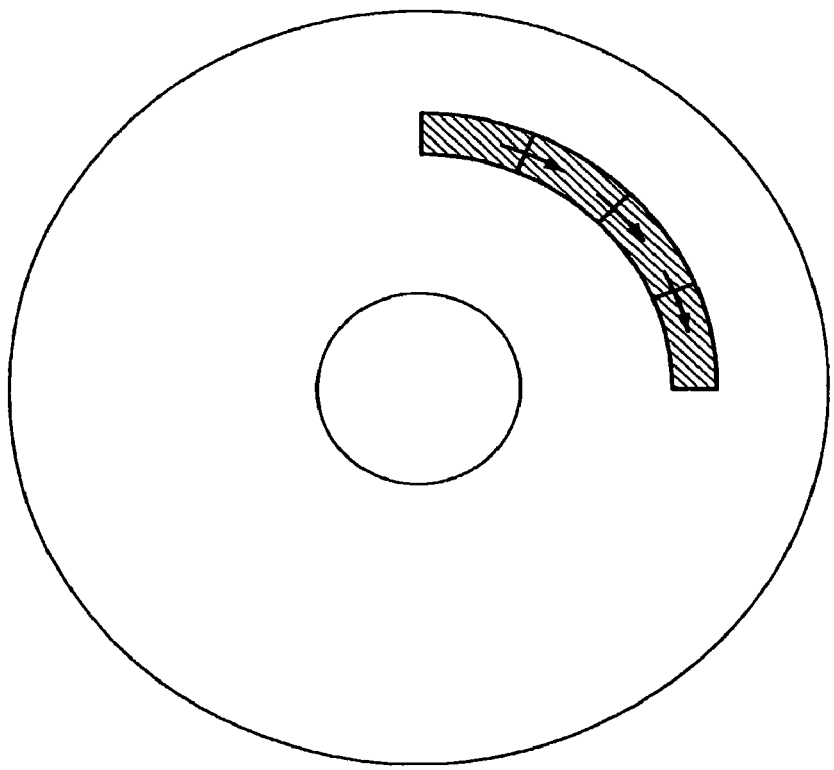

In the following, relating to the first example and the fourth example, "image data" is described in detail. With reference to FIGS. 14A and 14B, storing formats of data in a file are described. In a compound machine 101, as shown in FIG. 14A, image data (scanned data or print data) is stored in a file having a storing format in which storing areas are arranged sequentially in a HDD and the like. The file of the format shown in FIG. 14A is referred to as "RAW file" hereinafter.

In the file system of UNIX, as shown in FIG. 14B, data is stored in a file having a storing format in which storing areas in a HDD are arranged discretely. The file of the storing format for the file system of UNIX is referred to as "FS file" hereinafter.

In "backup process" in the first example and "storing process" in the fourth example, image data is stored in a RAW file that corresponds to an image forming job (scanning job or printing job) in the HDD 233 or the SD memory card of the compound machine 101. That is, pieces of image data are stored in RAW files in units of image forming jobs. Then, the data in the RAW file is stored in a FS file corresponding to the image forming job in the file system of the HDD 703.

In "restore process" of the first example or in "obtaining process" of the fourth example, the image data in the FS file stored in the file system in the HDD 703 is obtained and stored in a RAW file in the HDD 233 or the SD memory card 602 of the compound machine 101.

Since the RAW file has an advantage in that reading and writing can be performed at high speed, the RAW file is suitable for image forming processes that require high speed processing. In the backup process of the first example or in the storing process of the fourth example, since the image data is read from the high speed RAW file and is stored in the low speed FS file in which the file format is converted in the storing side, the speed of image forming processes in the compound machine side is not affected by the backup process or the storing process. In addition, by using the CPU 211 only for image forming processes while DMA transfer is used for the backup process or the storing process, the backup process or the storing process can be performed asynchronously to the image forming processes.

For convenience of image forming processes, the image data for the image forming processes, RAW files or FS files are stored in units of image forming jobs. In a case when image data of three pages is scanned in one time scanning job, the image data of the three pages is stored in a RAW file or in a FS file. In a case when image data of five pages is to be printed in one time printing job, the image data of the five pages is stored in a RAW file or in a FS file.

Figure 15:
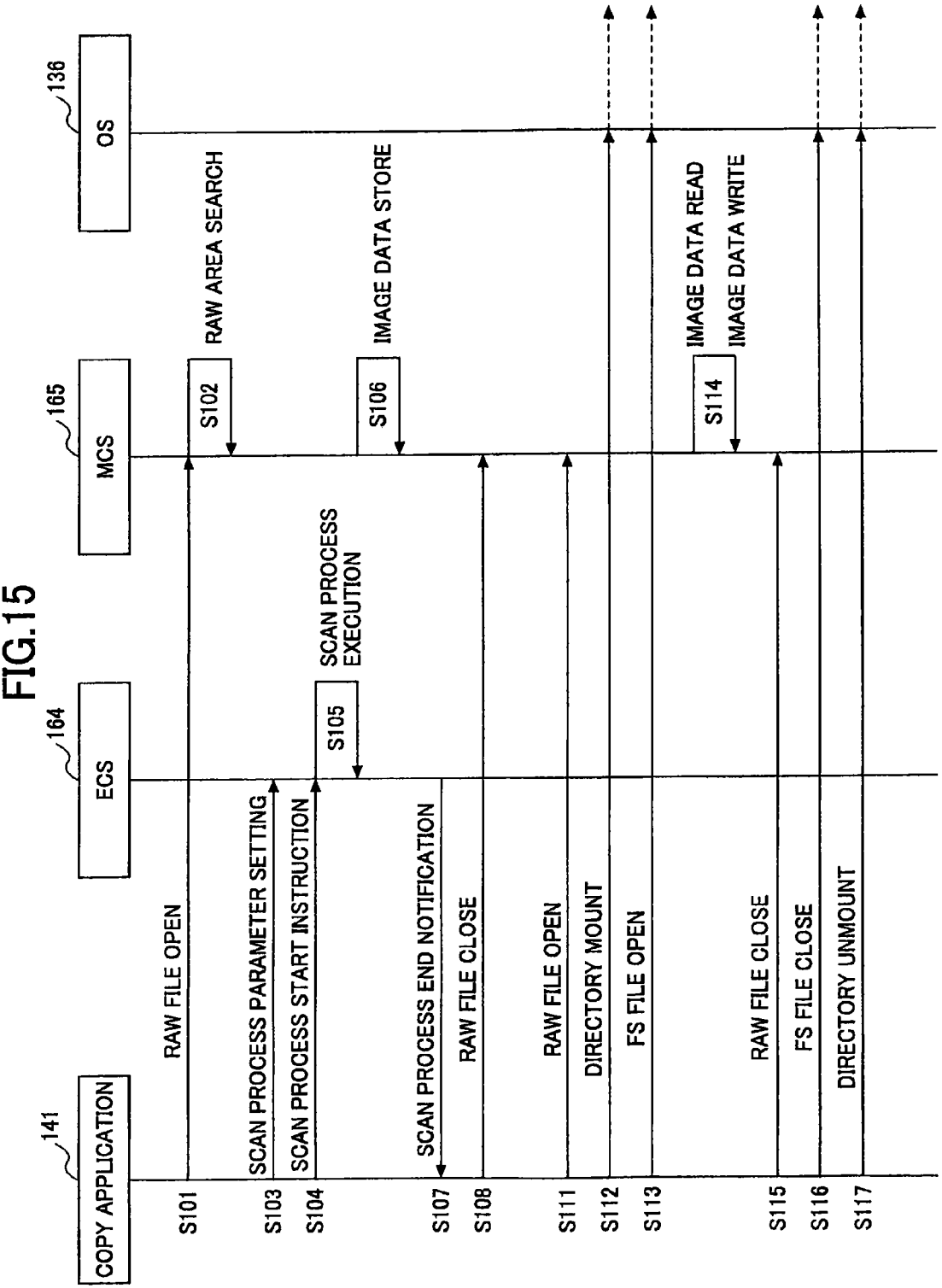
FIG. 15 is a sequence diagram relating to a copy process (scanning process)

FIG. 15 is a sequence diagram in which the backup process of the first example or the storing process of the fourth example is applied to a copy process (scanning process).

First, the copy application 141 (or SDK application) opens a RAW file in the compound machine 101 by using the MCS 165 in step 101. Next, the MCS 165 searches the HDD 233 for usable sequential storing areas in step 102. Next, the copy application 141 sets parameters (ADF/A4/color and the like) for a scanning process by using the ECS 164 in step 103, and instructs the ECS 164 to start the scanning process in step 104. Next, the ECS 164 performs the scanning process in step 105, and the MCS 165 stores the scanned image data in the RAW file in step 106. Next, the ECS 164 notifies the copy application 141 of the end of the scanning process in step 107. After that, the copy application 141 closes the RAW file of the compound machine by using the MCS 165.

Next, the copy application 141 (or SDK application) opens the RAW file by using the MCS 165 in step 111. Next, the copy application 141 mounts directories (file system 1001) of the server computer 701 on the compound machine 101 by using the OS 136 in step 112, so that the OS 136 opens a FS file in the server computer 701 in step 113. The directories to be mounted can be selected automatically or can be selected manually by using the touch panel 311. Next, the MCS 165 reads the scanned image data from the RAW file and write the scanned image data to the FS file in step 114. Next, the copy application 141 closes the RAW file by using the MCS 165 in step 115. Finally, the copy application 141 closes the FS file of the server computer by using the OS 136 in step 116, and the directories of the server computer is unmounted from the compound machine 101 by the OS 136 in step 117.

Figure 16:
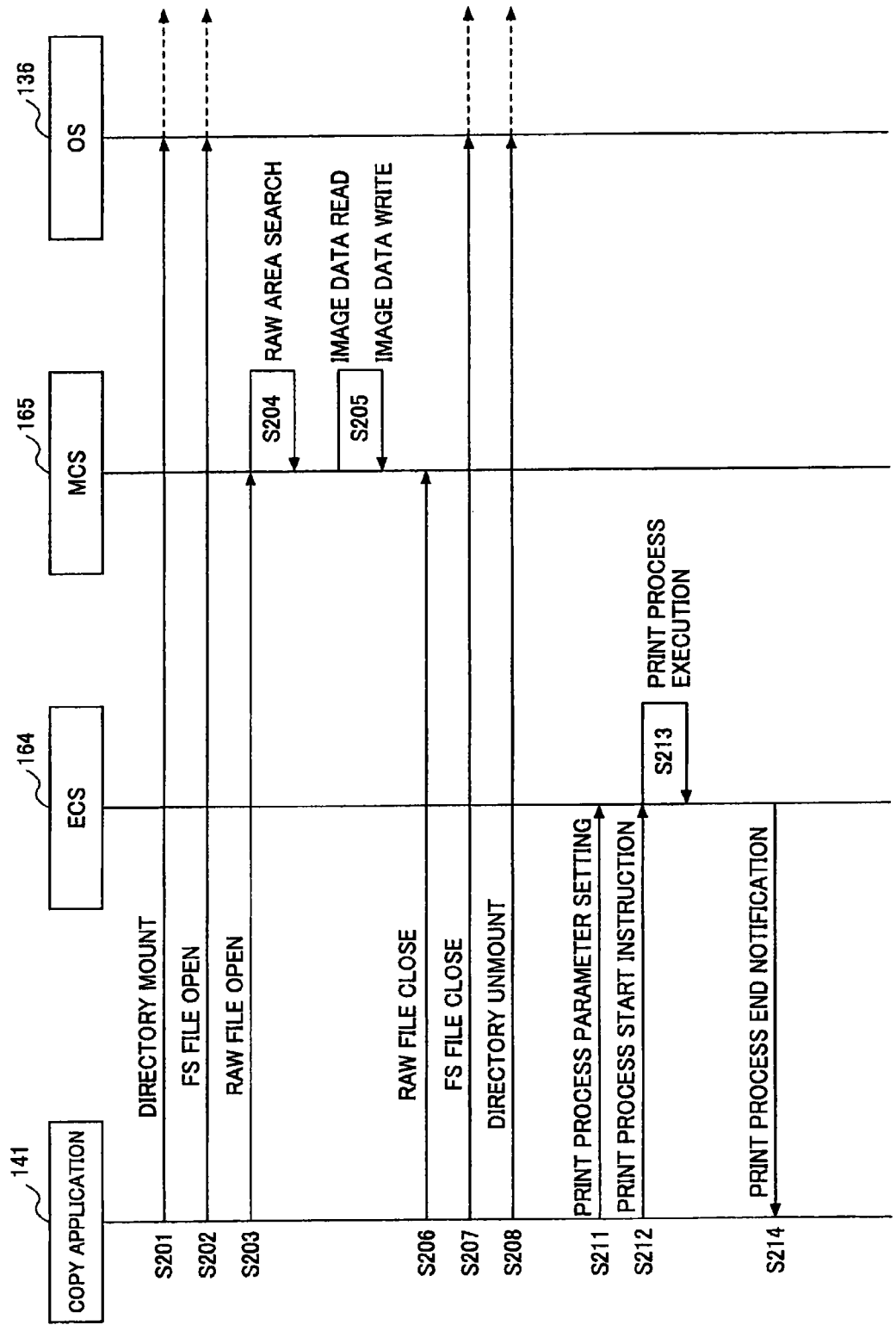
FIG. 16 is a sequence diagram relating to a copy process (print process)

FIG. 16 is a sequence diagram in which the restore process of the first example or the obtaining process of the fourth example is applied to the copy process (print process).

First, the copy application 141 (or SDK application) mounts the directories (file system 1001) of the server computer 701 on the compound machine 101 in step 201, so that the OS 136 opens a FS file of the server computer 701 in step 202. The directories to be mounted can be selected automatically or can be selected manually by using the touch panel 311. Next, the copy application 141 opens a RAW file in the compound machine 101 by using the MCS 165 in step 203. Next, the MCS 165 searches the HDD 233 for usable sequential storing areas in step 204. Next, the MCS 165 reads the scanned image data from the FS file and write the scanned image data into the RAW file in step 205. Next, the copy application 141 closes the RAW file of the compound machine 101 in step 206. Next, the copy application 141 closes the FS file of the server computer 701 by using the OS 136 in step 207, and unmounts the directories of the server computer 701 from the compound machine 101 by using the OS 136 in step 208.

Next, the copy application 141 (or SDK application) sets parameters (staple/A4/color and the like) for printing by using the ECS 164 in step 211, and instructs the ECS 164 to start printing in step 212. Next, ECS 164 performs printing in step 213. Finally, the ECS 164 notifies the copy application 141 of the end of the printing in step 214.

Figure 17:
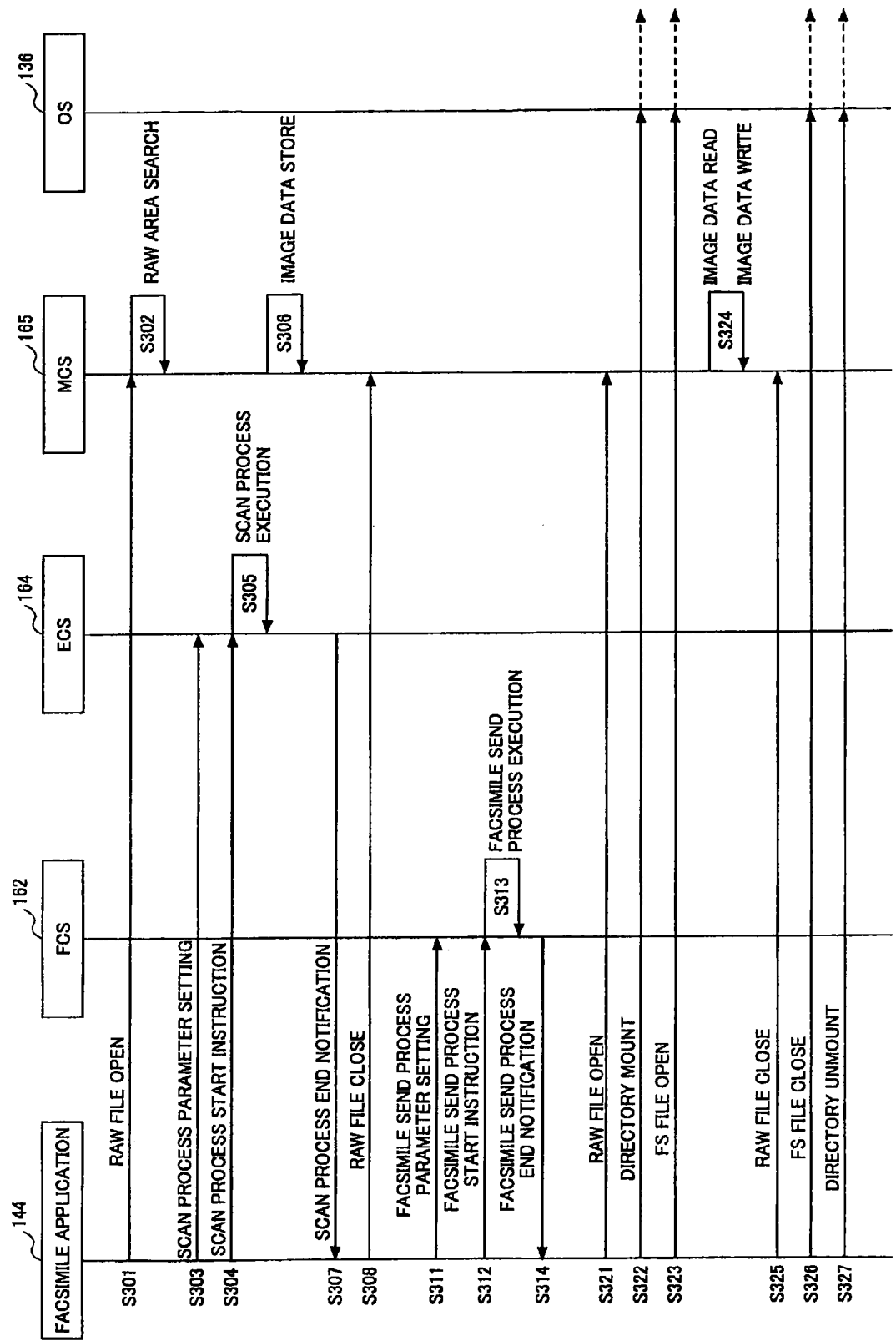
FIG. 17 is a sequence diagram relating to a facsimile sending process.

FIG. 17 is a sequence diagram in which the backup process of the first example or the storing process of the fourth example is applied to a facsimile sending process.

First, the facsimile application 144 (or SDK application) opens a RAW file in the compound machine 101 by using the MCS 165 in step 301. Next, the MCS 165 searches the HDD 233 for usable sequential storing areas in step 302. Next, the facsimile application 144 sets parameters (ADF/A4/black and white and the like) for a scanning process by using the ECS 164 in step 303, and instructs the ECS 164 to start the scanning process in step 304. Next, the ECS 164 performs the scanning process in step 305, and the MCS 165 stores the scanned image data in the RAW file in step 306. Next, the ECS 164 notifies the facsimile application 144 of the end of the scanning process in step 307. After that, the facsimile application 144 closes the RAW file of the compound machine 101 by using the MCS 165 in step 308.

Next, the facsimile application 144 (or SDK application) sets parameters (facsimile destination and the like) for facsimile sending process by using the FCS 162 in step 311, and instructs the FCS 162 to start the facsimile sending process in step 312. Next, FCS 162 performs the facsimile sending process in step 313. Then, the FCS 162 notifies the facsimile application 144 of the end of the facsimile sending process in step 314.

Next, the facsimile application 144 (or SDK application) opens the RAW file by using the MCS 165 in step 321. Next, the facsimile application 144 mounts directories (file system 1001) of the server computer 701 on the compound machine 101 by using the OS 136 in step 322, so that the OS 136 opens a FS file in the server computer 701 in step 323. The directories to be mounted can be selected automatically or can be selected manually by using the touch panel 311. Next, the MCS 165 reads the scanned image data from the RAW file and writes the scanned image data to the FS file in step 324. Next, the facsimile application 144 closes the RAW file by using the MCS 165 in step 325. Finally, the facsimile application 144 closes the FS file of the server computer by using the OS 136 in step 326, and the directories of the server computer is unmounted from the compound machine 101 by the OS 136 in step 327.

Figure 18:
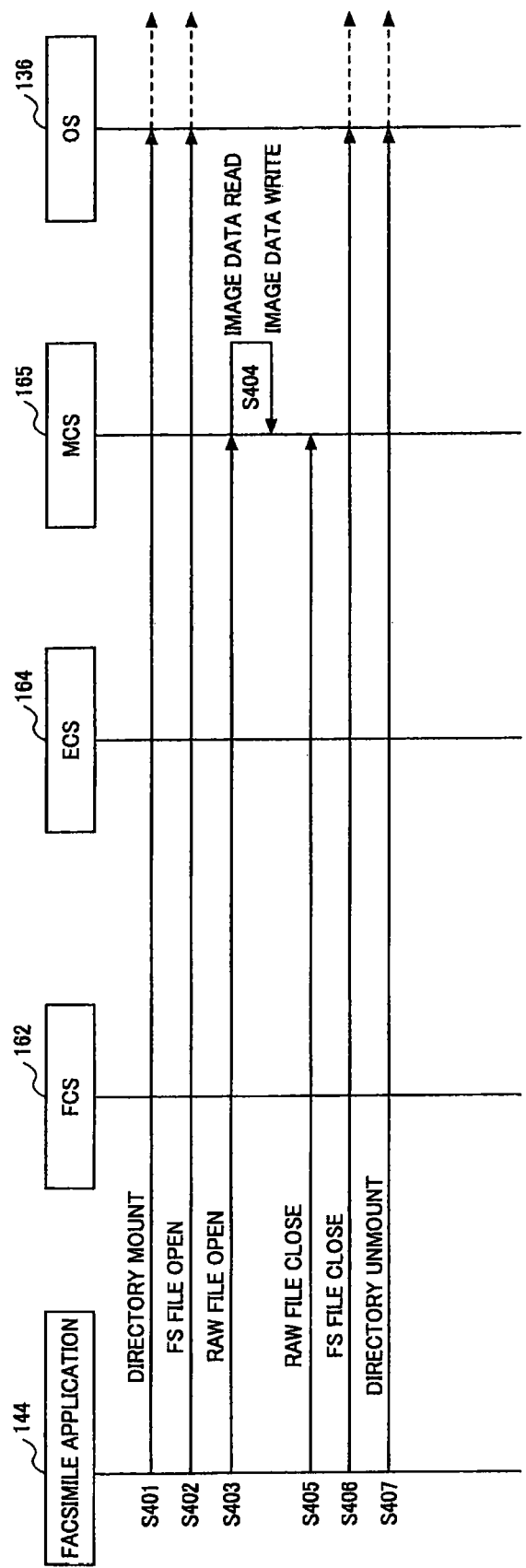
FIG. 18 is a sequence diagram relating to a facsimile receiving process.

FIG. 18 is a sequence diagram in which the backup process of the first example or the storing process of the fourth example is applied to the facsimile receiving process.

First, the facsimile application 144 (or SDK application) mounts the directories (file system 1001) of the server computer 701 on the compound machine 101 in step 401, so that the OS 136 opens a FS file of the server computer 701 in step 402. The directories to be mounted can be selected automatically or can be selected manually by using the touch panel 311. Next, the facsimile application 144 opens a RAW file of a received facsimile in the compound machine 101 by using the MCS 165 in step 403. Next, the MCS 165 reads the facsimile image data from the RAW file and write the facsimile image data into the FS file in step 404. Next, the facsimile closes the RAW file of the received facsimile in the compound machine 101 in step 405. Finally, the facsimile application 144 closes the FS file of the server computer 701 by using the OS 136 in step 406, and unmounts the directories of the server computer 701 from the compound machine 101 by using the OS 136 in step 407.

Figure 19:
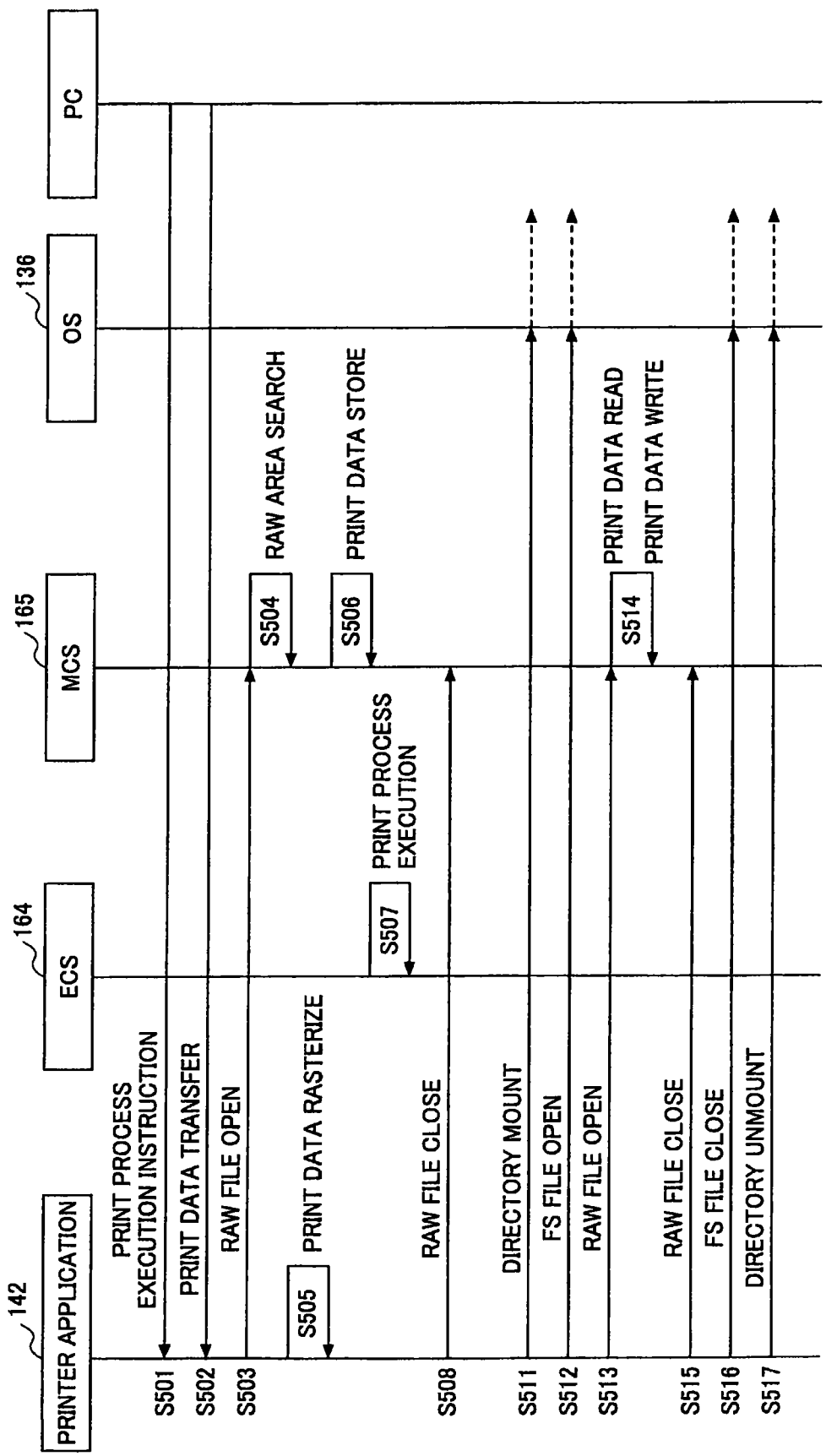
FIG. 19 is a sequence diagram relating to a printing process.

FIG. 19 is a sequence diagram in which the backup process of the first embodiment and the storing process of the fourth embodiment is applied to a printing process.

A PC instructs the compound machine 101 to perform the printing process in step 501, and sends print data to the compound machine 101 in step 502. Next, the printer application 142 opens a RAW file of the compound machine 101 by using the MCS 165 in step 503. Next, the MCS 165 searches the HDD for usable sequential storing areas in step 504. Next, the printer application 142 rasterizes the transferred print data in step 505. Then, the MCS 165 stores the rasterized print data into the RAW file in step 506, and the ECS 164 performs a printing process for the print data stored in the RAW file in step 507. The steps 505, 506 and 507 are performed in parallel for each page. Then, the printer application 142 closes the RAW file of the compound machine 101 by using the MCS 165 in step 508.

Next, the printer application 142 mounts the directories (file system 1001) of the server computer 701 on the compound machine by using the OS 136 in step 511, and opens the FS file of the server computer 701 by using the OS 136 in step 512. The directories to be mounted can be automatically selected or can be selected manually by using the touch panel 311. Next, the MCS 165 reads print data from the RAW file and writes the print data to the FS file in step 514. Next, the printer application 142 closes the RAW file by using the MCS 165 in step 515. Finally, the printer application 142 closes the FS file of the server computer 701 in step 516 and unmounts the directories of the server computer 701 from the compound machine 101 in step 517.

(6) User Information

In the following, relating to the first example and the fourth example, user information is described in detail.

The compound machine 101 performs authentication or user restriction for users who uses the compound machine 101. That is, each user who wants to use the compound machine 101 should be authenticated by the compound machine 101. Further, use restriction for resources of the compound machine 101 is performed. For example, a user A is restricted to use only a file A, a user B is restricted not to use a directory B. The authentication process and the use restriction process are performed by the CCS 167.

The compound machine 101 stores authentication information and use restriction information, wherein the authentication information is used for authenticating users and the use restriction information is used for restricting use of resources of the compound machine 101. The storing destination of the authentication information and the use restriction information may be either of the HDD 233 or the SD memory card 602 of the compound machine 101. However, considering usage of the authentication information and the use restriction information, the SD memory card 602 that is an IC memory may be better than the HDD 233 that is a magnetic memory. A NVRAM (nonvolatile random-access memory) in the compound machine 101 may be used as the storing destination of the authentication information and the use restriction information. The authentication information and the use restriction information are managed by the UCS 168.

A user who manages the compound machine 101 registers authentication information of users and sets use restriction information of users. Then, the compound machine is restarted so that the authentication registration setting or use restriction setting becomes effective. These operations are the same as those of account registration and mode setting of UNIX.

In the backup process of the first example or the storing process of the fourth example, the use restriction information stored in the SD memory card 602 (or HDD 233) of the compound machine 101 is stored in the file system 1001 in the HDD 703.

In the restore process of the first example or the obtaining process of the fourth example, the use restriction information stored in the file system 1001 in the HDD 703 is obtained by the SD memory card 602 (or HDD 233) of the compound machine 101.

Retaining a high level of security is becoming an important problem as the information processing function of the compound machine 101 has become more advanced. The use restriction information is important information for retaining the security of the compound machine 101. For this purpose, loss or theft of the use restriction information should be avoided. Thus, a backup of the use restriction information can be performed by using the backup method of the first example. Further, for the purpose of sharing use restriction information, the use restriction information can be stored by the storing process of the fourth example.

Figure 20:
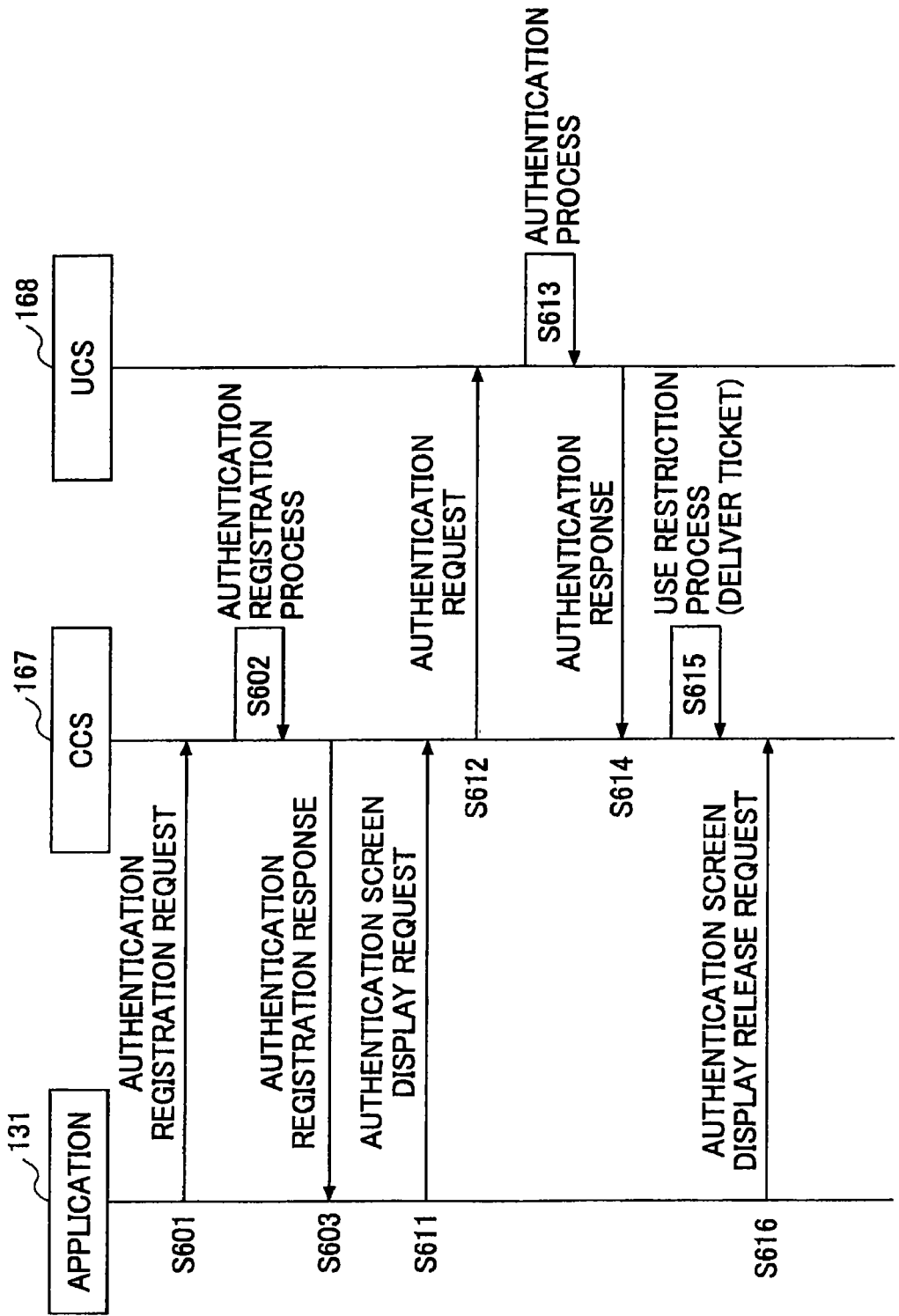
FIG. 20 is a sequence diagram of an authentication process and a use restriction process.

FIG. 20 is a sequence diagram of the authentication process and the use restriction process.

First, an authentication registration request is sent from the application 131 to the CCS 167 in step 601. Next, the CCS 167 performs an authentication registration process for the application 131 in step 602. Next, an authentication registration response is sent from the CCS 167 to the application 131 in step 603. By sending the authentication registration response, an authentication method is notified wherein the authentication method may be login, media, biometrics, coin lack, or prepaid card or the like.

Next, an authentication screen display request is sent from the application to the CCS 167 in step 611. Next, when a user inputs authentication information on an authentication screen, an authentication request of the user is sent from the CCS 167 to the UCS 168 in step 612. Next, the UCS 168 performs authentication process of the user in step 613. Next, an authentication response of the user is sent from the UCS 168 to the CCS 167 in step 614. Then, the CCS 167 distributes a ticket of the user as a use restriction process (use restriction release process) in step 615. Finally, an authentication screen display release request is sent from the application 131 to the CCS 167 in step 616.

(7) Power Source Mode

Relating to the second example and the third example, "power source mode" is described.

Two power source modes exist in the compound machine 101. One mode is "ON mode" that corresponds to a status where the power is on. Another mode is "OFF mode" that corresponds to a status where the power is OFF. When the compound machine 101 is used, from a point of view of convenience, it is desirable to keep "ON mode" so as to set the compound machine in a waiting mode at all times. However, from a viewpoint of power saving, it is not desirable to keep "ON mode" at all times.

Thus, the "ON mode" includes a "power saving mode" in addition to a normal "waiting mode", wherein the power saving mode is a mode for saving consumed power while the compound machine is waiting for image forming process. In the power saving mode, power sources that usually consume large power in a waiting status reduce power consumption, wherein the power sources that usually consume large power include a heater power source of a phaser of the printing part 122, a motor power source of a spindle of the HDD 233, a panel power source of the touch panel 311 and the like. Power sources that consume small power such as a power source of NIC 241 remains in the usual waiting mode. Accordingly, the viewpoint of convenience and the viewpoint of the power saving become compatible.

When a predetermined time (three minutes, for example) elapses or when a current time enters a predetermined time zone (mid-night, for example) in a waiting mode, the mode changes to the power saving mode. In the power saving mode, when a predetermined time (three minutes, for example) elapses or when a current time enters a predetermined time zone (mid-night, for example), the mode changes to the OFF mode. In the OFF mode, when the compound machine 101 receives facsimile image data or scanned data of print data, the mode changes to the power saving mode. When the power is turned off, the power mode is changed from ON mode (waiting mode or power saving mode) to OFF mode. When the power is turned on, the power source mode is changed from OFF mode to ON mode (waiting mode).

Figure 21:
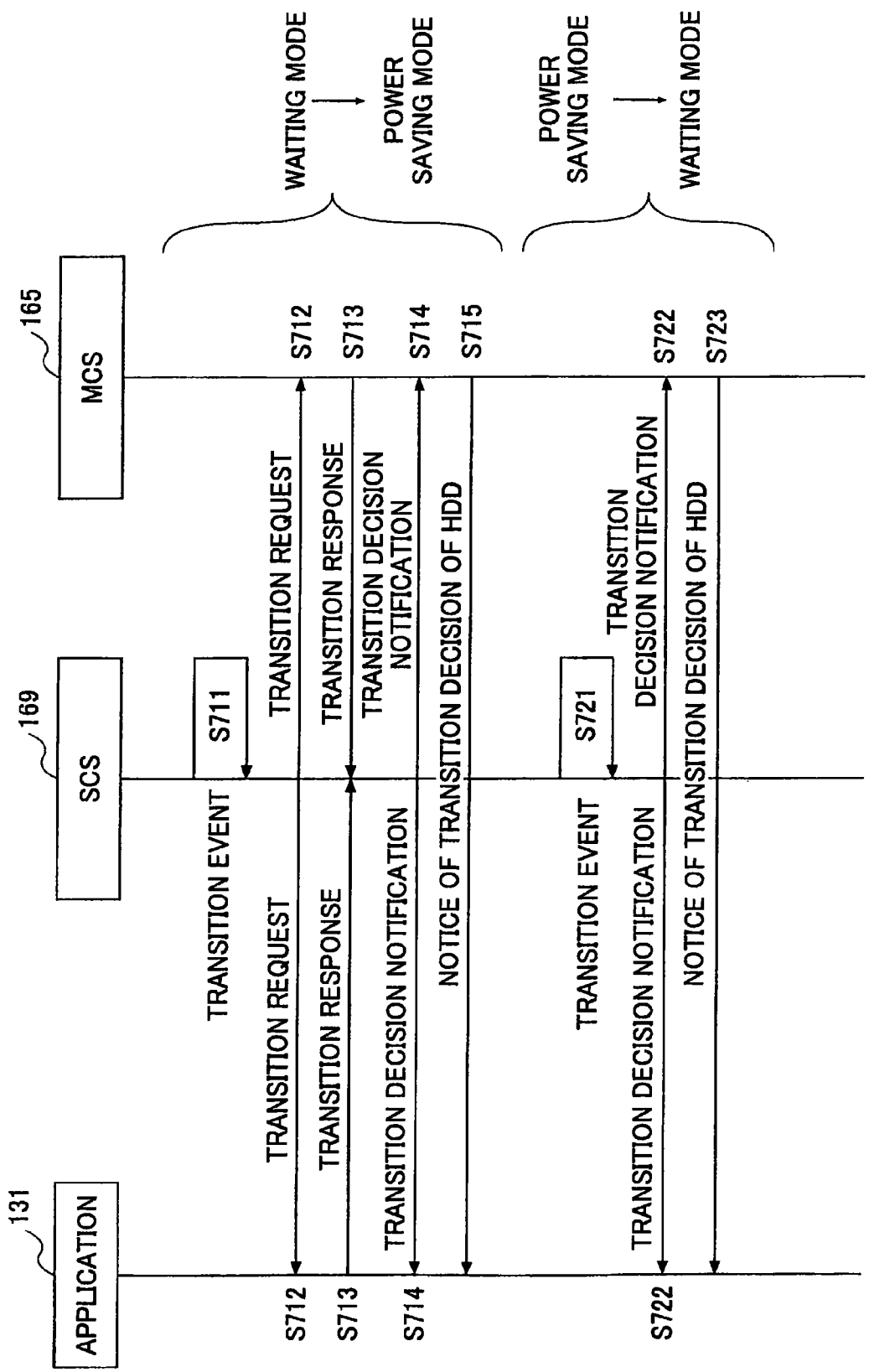
FIG. 21 is a sequence diagram showing a transition process from a waiting mode to a power saving mode.

FIG. 21 is a sequence diagram showing a transition process from the waiting mode to the power saving mode.

When a predetermined time elapses or when a current time enters a predetermined time zone in a waiting mode in step 711, a request of transition to the power saving mode is sent from the SCS 169 to the MCS 165 and to the application 131 in step 712. Then, a response of transition to the power saving mode is sent from the MCS 165 and from the application 131 to the SCS 169 in step 713. Next, a decision notification of transition to the power saving mode is sent from the SCS 169 to the MCS 165 and the application 131 in step 714. Next, a decision notification of transition to the power saving mode of the power source of the HDD 233 is sent from the MCS 165 to the application 131 in step 715.

When an operation is performed in the compound machine 101 in the power saving mode in step 721, a decision notification of transition to the waiting mode is sent from the SCS 169 to the MCS 165 and to the application 131 in step 722. Next, a decision notification of transition to a waiting mode in the power source of the HDD 233 is sent from the MCS 165 to the application 131 in step 723.

Figure 22:
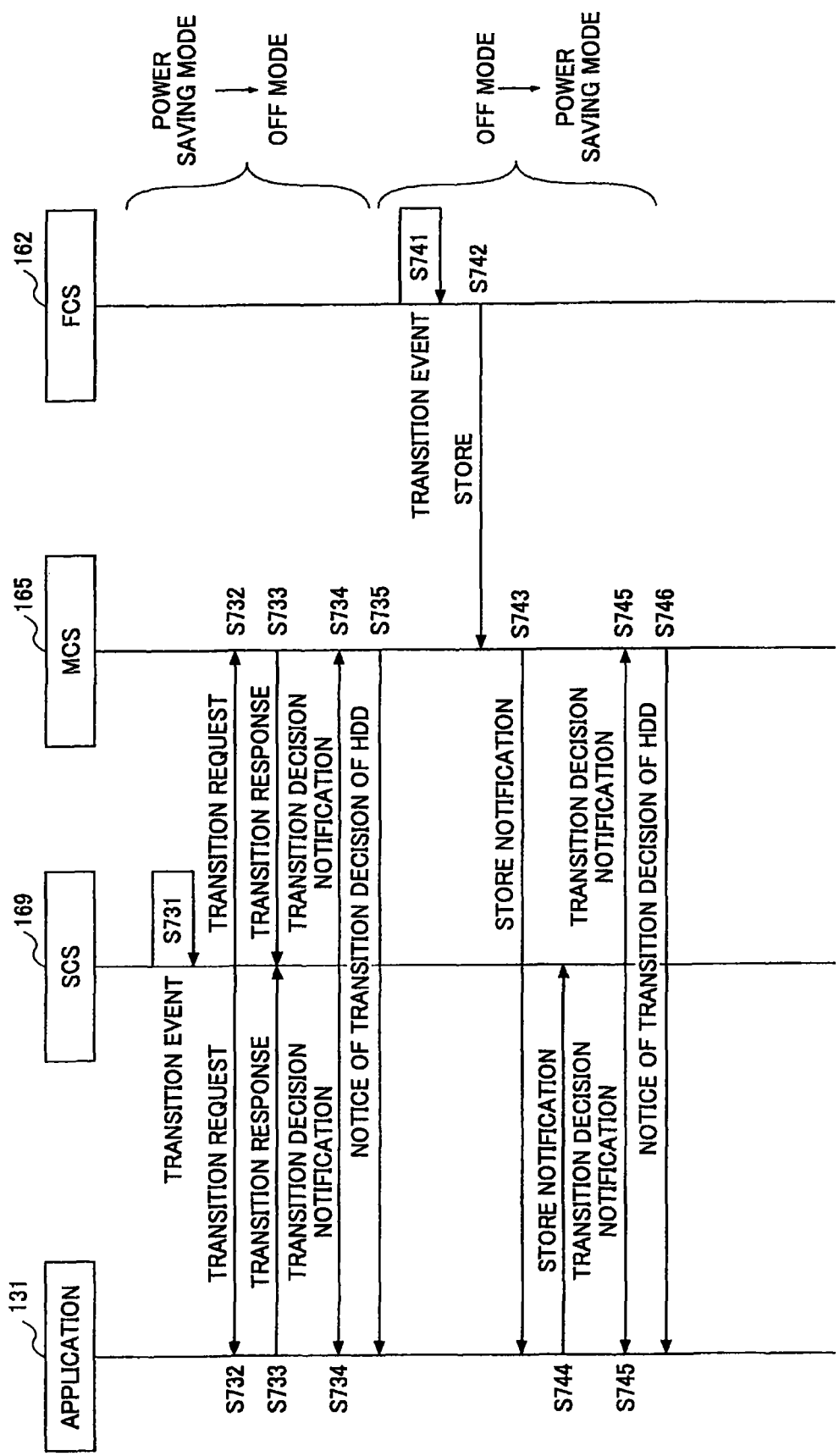
FIG. 22 is a sequence diagram of a transition process from a power saving mode to an OFF mode.

FIG. 22 is a sequence diagram of a transition process from the power saving mode to the OFF mode.

When a predetermined time elapses in the power saving mode or when a current time enters a predetermined time zone in the power saving mode in step 731, a request of transition to the OFF mode is sent from the SCS 169 to the MCS 165 and the application 131 in step 732. Then, a response of transition to the OFF mode is sent from the MCS 165 and the application 131 to the SCS 169 in step 733. Next, a decision notification of transition to the OFF mode is sent from the SCS 169 to the MCS 165 and the application 131 in step 734. Next, a decision notification of transition to the OFF mode of the power source of the HDD 233 is sent from the MCS 165 to the application 131 in step 735.

When the compound machine receives facsimile image data in the OFF mode in step 741, the facsimile image data is sent from the FCS 162 to the MCS 165 by which the facsimile image data is stored in step 742. Then, a notification of storing the facsimile image data is sent from the MCS 165 to the application 131 in step 743. Next, a notification of storing the facsimile image data is sent from the application 131 to the SCS 169 in step 744, and a decision notification of transition to the power saving mode is sent from the SCS 169 to the MCS 165 and the application 131 in step 745. Next, a decision notification of transition to the power saving state of the power source of the HDD 233 is sent from the MCS 165 to the application 131 in step 746.

Since the power of the HDD 233 becomes in the power saving status in the power saving mode, a program cannot be launched from the HDD 233. However, since a power source of the NIC 241 is in a waiting status, a program can be launched via the NIC 241. In other words, a program can be launched via a network. Although a program in the HDD 233 cannot be launched, a program in the HDD 703 (or in the SD memory card 705) of the server computer 701 can be launched. Thus, in the second or third example, the HDD 703 in the server computer 701 is used as a storing destination of a SDK application, so that the SDK application stored in the HDD 703 is loaded into the compound machine 101 and is launched in the compound machine 101.

In the second example, the SDK application can be launched in either of the waiting mode or in the power saving mode. In the third example, even when the mode is changed from the waiting mode to the power saving mode while debugging the SDK application, the debugging of the SDK application is not interrupted.

Figure 23:
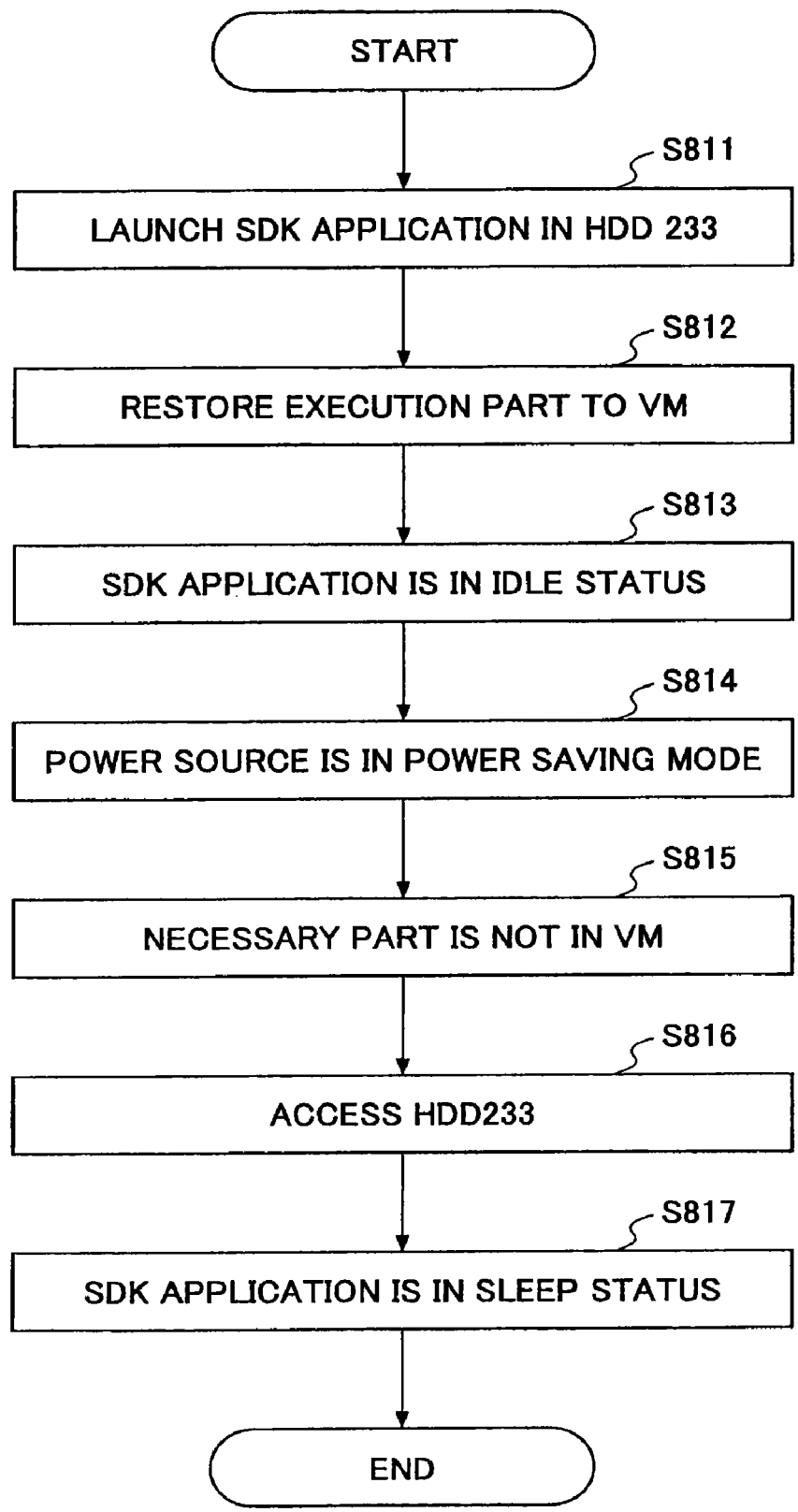
FIG. 23 is a flowchart of a launching process of a SDK application in the HDD 233.

FIG. 23 is a flowchart of a launching process of the SDK application in the HDD 233.

For launching the SDK application stored in the HDD 233 in step 811, the compound machine 101 loads an execution portion of the SDK application into the VM (virtual memory) in step 812. When the mode becomes the power saving mode while the SDK application is in an idle state (steps 813, 814), the compound machine 101 checks if a necessary portion of the SDK application is loaded in the VM. When the necessary portion of the SDK application is not loaded in the VM in step 815, the compound machine tries to access the HDD 233 to load the necessary portion of the SDK application into the VM in step 816. However, since the HDD 233 is in the power saving status, the HDD 233 cannot be accessed so that the necessary portion of the SDK application cannot be restored in the VM. As a result, the SDK application enters a sleep status in step 817.

To avoid this problem, the SDK application or a daemon may be loaded and executed in a RAM or a ROM. However, this method has a problem in that the capacity of the RAM or a ROM may become insufficient.

Figure 24:
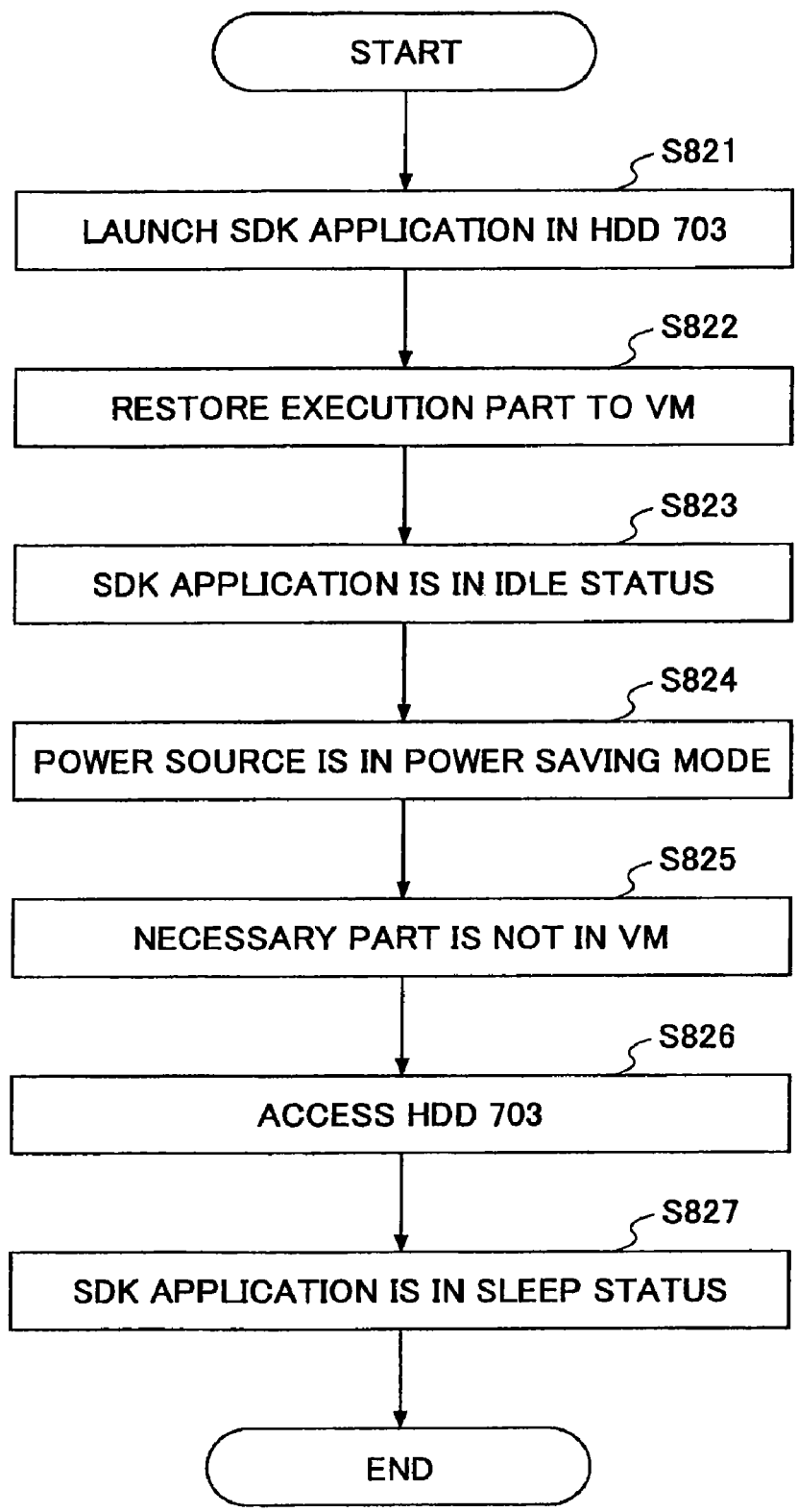
FIG. 24 shows a flowchart of a launching process of a SDK application in the HDD 703.

FIG. 24 shows a flowchart of a launching process of a SDK application in the HDD 703.

In a case when a SDK application stored in the HDD 703 is loaded in the compound machine in step 821, the compound machine 101 loads an execution portion of the SDK application in the VM in step 822. When the mode becomes the power saving mode while the SDK application is in an idle state (steps 823, 824), the compound machine 101 checks if a necessary portion of the SDK application is loaded in the VM. When the necessary portion of the SDK application is not loaded in the VM in step 825, the compound machine tries to access the HDD 703 to load the necessary portion of the SDK application into the VM in step 826. In this case, since the NIC 241 is in a waiting mode, the HDD 703 can be accessed, so that the necessary portion of the SDK application can be loaded in the VM. The SDK application is still in an idle state in step 827. In the above mentioned embodiment, the MCS 165 is an example of the information processing program of the present invention, and a SD memory card storing the MCS 165 is an example of the recording medium of the present invention. The compound machine 101 is an example of the image forming apparatus of the present invention and the information processing performed in the compound machine 101 is an example of the information processing method of the present invention.

(Second Embodiment)

In the following, the second embodiment of the present invention is described. The second embodiment is different from the first embodiment in that the compound machine 101 functions as a server of NFS in the second embodiment.

(NFS)

In the following, an information processing system of FIG. 25 including the compound machine 101 shown in FIG. 1 is described. The information processing system shown in FIG. 25 includes the compound machine 101 and a PC (personal computer) 1701. The compound machine 101 and the PC 1701 are connected by a LAN (local area network) 1702. The LAN 1702 is constituted by the Ethernet in this example.

The compound machine 101 of FIG. 1 performs various information processes by using various programs such as applications 131 and platforms 132. The compound machine includes storing devices such as the HDD 233 and the SD memory card 602. In the information processing system of FIG. 25, not only the compound machine 101 but also the PC 1701 can use the HDD 233 and the SD memory card 602 in the compound machine 101.

To realize this configuration, NFS (network file system) that is one of technologies for realizing a distributed file system is used in this embodiment. A file system in the HDD 203 in the compound machine 101 can be used as a distributed file system of the PC 1701. In the information processing system of FIG. 25, a file system of the compound machine 101 is used as a storing destination of information relating to information processing of the PC 1701.

UNIX as the OS 136 is installed in the HDD 223 of the compound machine 101. The compound machine 101 functions as a server (NFS server) of the distributed file system of NFS. The OS (UNIX) is also installed in the HDD 1703 in the PC 1701. The PC 1701 is connected to the compound machine 101 via the network, so that the PC 1701 functions as a client (NSF client) of NFS. Accordingly, information processing of NFS such as "vfs (virtual file system) operation", "v-node(virtual node) operation" can be performed by UNIX.

Network protocols used for network communications for NFS between the compound machine 101 and the PC 1701 are IP as a network (third) layer protocol in OSI reference model, UDP as a transport (fourth) layer protocol, RPC as a session (fifth) layer protocol, and XDR as a presentation (sixth) layer protocol. Although TCP may be used as the transport (fourth) layer protocol, UDP is used in this embodiment in consideration of speed rather than reliability.

As a technology for realizing the distributed file system, "samba" may be used instead of NFS. In this case, UNIX is installed in the HDD 233 of the compound machine 101 so that the compound machine 101 functions as a server (samba server) of the distributed file system of samba. Windows is installed in the HDD 1703 in the PC 1701 as the OS 1706, so that the PC 1701 functions as a client (samba client) in samba. By using samba, the Windows machine can use shared folders in a UNIX machine.

Network protocols for performing network communications for samba between the compound machine 101 and the PC 1701 are IP as the third layer, TCP as the fourth layer, NETBIOS as the fifth layer, SMB as the sixth layer, and samba as the seventh layer. Alternatively, NetBEUI can be used as the third and fourth layers, and NETBIOS can be used as the fifth layer. Further alternatively, IPX can be used as the third layer, and SPX can be used as the fourth and fifth layers. Since SMB supports the folder sharing function and the file sharing function of Windows, the samba server can be called as a SMB server and the samba client can be called a SMB client.

As mentioned above, although either of NFS or samba or other technologies can be used for realizing the distributed file system, NFS is used in the following example.

Figure 26:
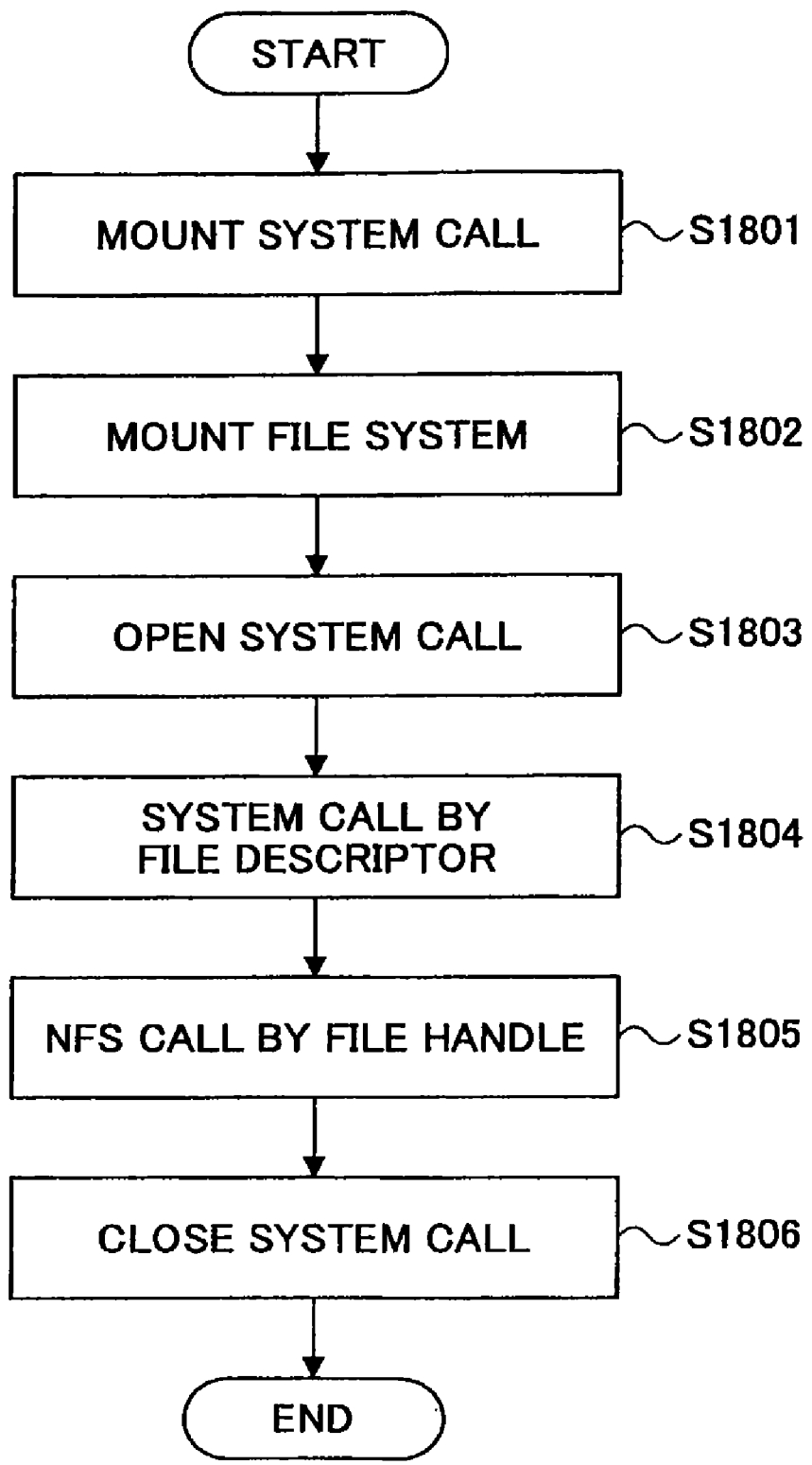
FIG. 26 is a flowchart for explaining an example for explaining an information processing using NFS.

By referring to FIG. 26, an example of information processing performed by the PC 1701 in the case where an application 1708 in the PC 1701 accesses a file in the file system of the compound machine 101 is described.

When the application 1708 in the PC 1701 accesses a file in a file system of the compound machine 101, the application issues a mount system call for the file system of the compound machine 101 in step 1801. In response to that, the OS 1706 of the PC 1701 mounts the file system of the compound machine 101 on the PC 1701 in step 1802, so that the file system of the compound machine 101 is accessible as a distributed file system of the PC 1701.

Next, the application 1708 of the PC 1701 accesses the file system as the distributed file system of the PC 1701 so as to access the file.

When the application 1708 of the PC 1701 starts to access the file, the application issues an open system call to the file in step 1803. When the application ends to access the file, the application issues a close system call to the file in step 1806. By performing the open system call, the application 1708 of the PC 1701 obtains a file descriptor of the file and the OS 1706 of the PC 1701 obtains a file handle of the file.

When the application 1708 of the PC 1701 accesses the file, the application 1708 performs a system call by using the file descriptor in step 1804. In response to that, the OS 1706 of the PC 1701 sends a system call of the file descriptor as a NFS call of the file handle to the OS 136 of the compound machine 101 in step 1805. When the OS 136 of the compound machine 101 receives the NFS call, the OS 136 executes a command of the NFS call.

The file system of the PC 1701 is described with reference to FIG. 27. In UNIX, the storage area in the HDD is managed by dividing the area into a plurality of partitions. Usually, in UNIX, the partitions from "a" to "h" exists. The partition "a" is a root file system "/", the partition "b" is SWAP, "c" is a whole area, partitions from "d" to "h" are the file system such as "/user" and the like. FIG. 27 is an example of information on the file system of the PC 1701 that is displayed by a df command of the OS 1706 (UNIX). FIG. 27 shows that "a" in the HDD 1703 is mounted on "/", "e" is mounted on "/user". In addition, FIG. 27 shows that "/dir1" that is a directory (file system) of the compound machine 101 "host_a" is mounted on "/host_a/dir1" that is a directory (mount point) of the PC 1701.

Figure 25:
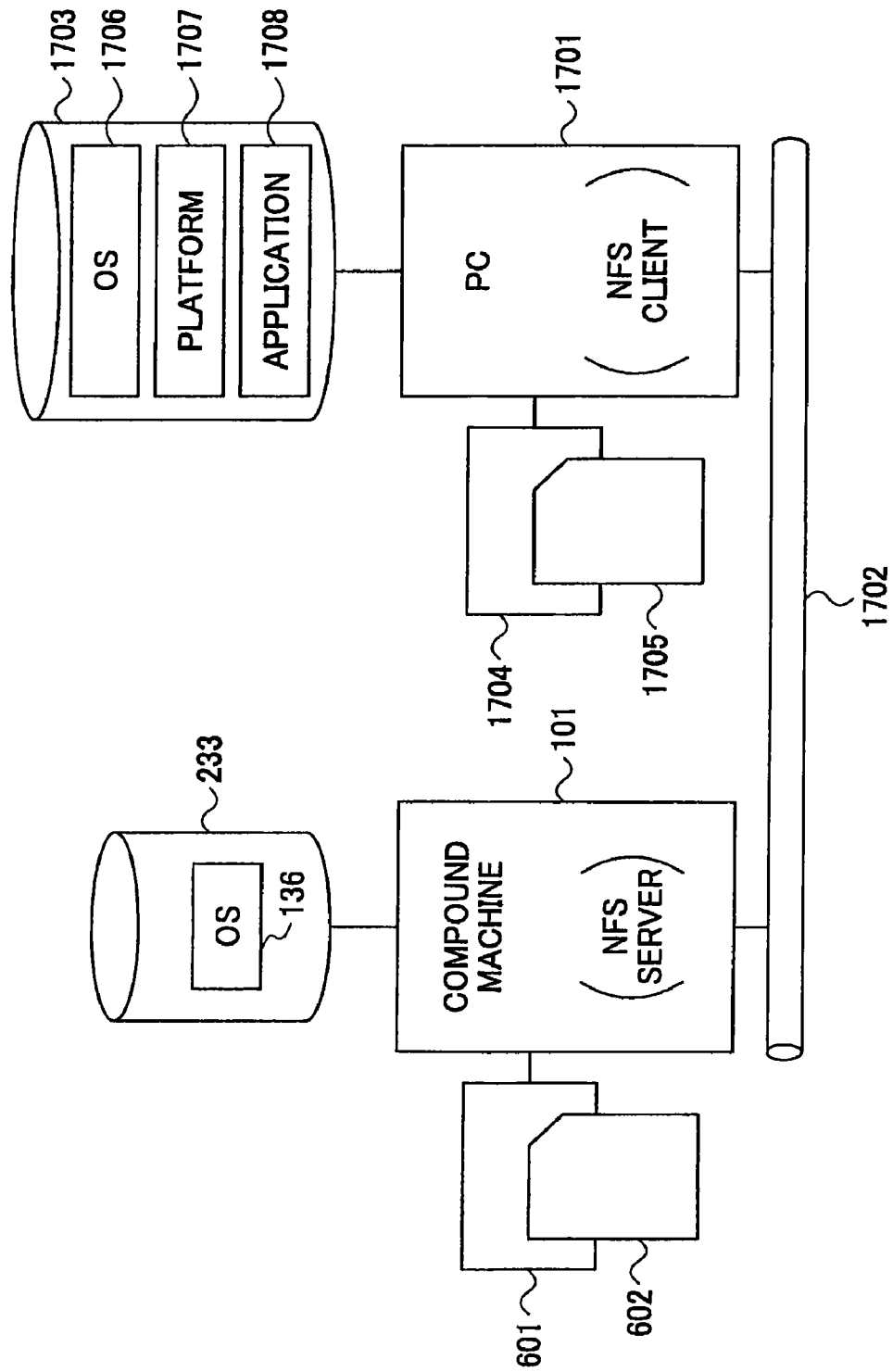
FIG. 25 shows an information processing system using NFS.

As mentioned above, in the information processing system of FIG. 25, NFS (network file system) that is one of technologies for realizing the distributed file system can be used. In the following, an example of usage of NFS in the information processing system of FIG. 25 is described in more detail.

(1) Examples of Usage of NFS

Figure 28:
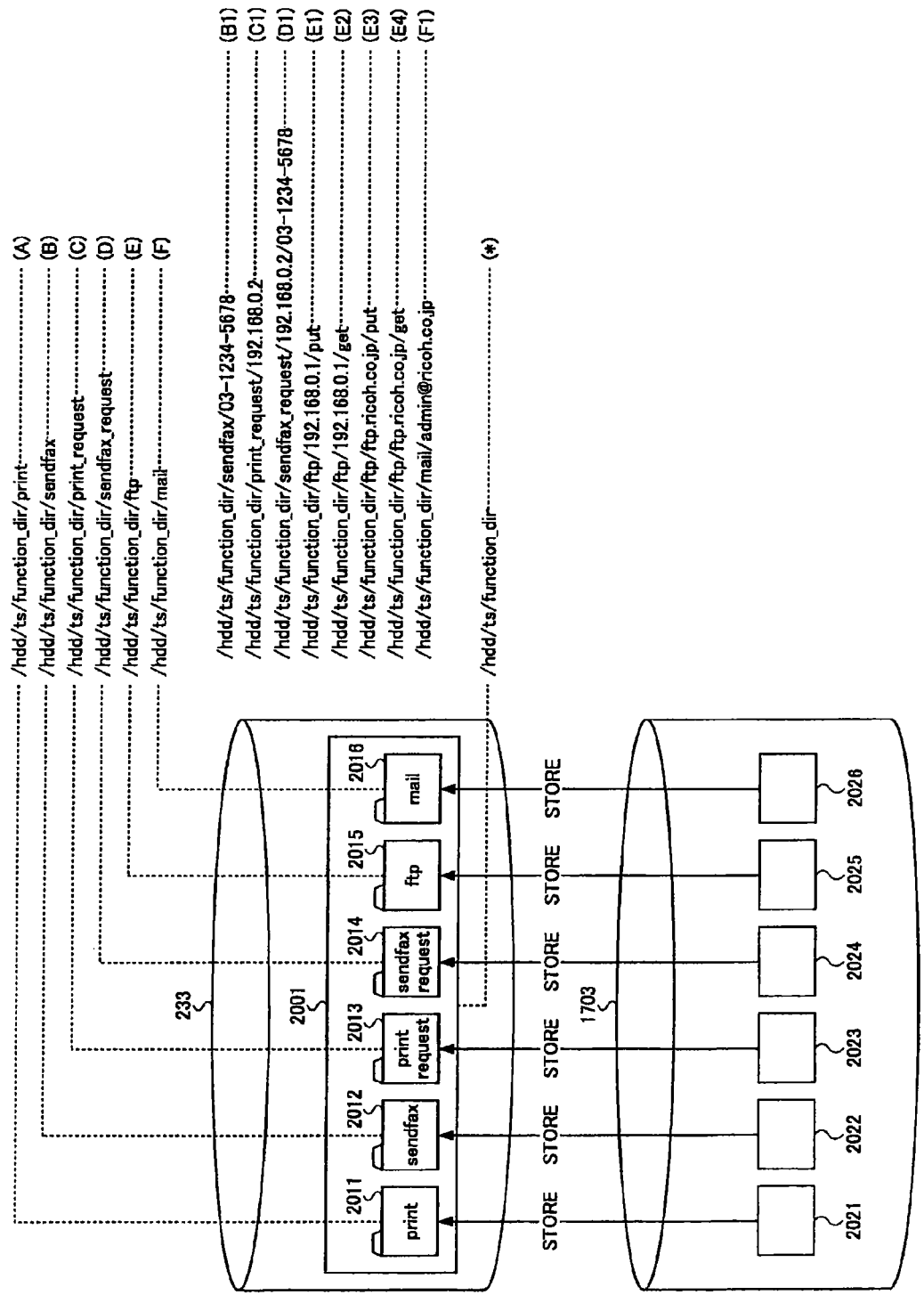
FIG. 28 is a figure for explaining examples of usage of NFS.

FIG. 28 is a figure for explaining examples of usage of NFS.

The file system 2001 of FIG. 28 is a file system of the compound machine 101 to be accessed by various apparatuses as distributed file systems of the various apparatuses.

PC 1701 accesses the file system 2001 of the compound machine 101 as a distributed file system of the PC 1701, so that the PC 1701 can store a file 2021 used for printing in a directory 2011 in the file system 2001. In the same way, a file 2022 used for facsimile sending can be stored in a directory 2012 used for facsimile sending. In the same way, a file 2023 used for printing can be stored in a directory 2013 used for printing. In the same way, a file 2024 used for facsimile sending can be stored in a directory 2014 used for facsimile sending. In the same way, a file 2025 for ftp can be stored in a directory 2015 for ftp processing. In the same way, a file 2026 used for mail processing can be stored in a directory 2016 for mail processing.

The path names of the file system 2001 shown in FIG. 28 as "*". Path names of the directories 2011, 2012, 2013, 2014, 2015 and 2016 are shown in FIG. 28 as path names "A, B, C, D, E, F".

When a file is stored in the directory 2011 for printing in the file system 2001, the compound machine 101 performs print process for the file. The application (printer application 142 or SDK application) performs the print process. The file to be stored is an electronic document file for example.

When a file for facsimile sending is stored in the directory 2012 in the file system 2001, the compound machine 101 performs facsimile sending processing for the file. The application (facsimile application 144 or SDK application) performs the facsimile sending processing. The file to be stored is a scanned image file for example.

As mentioned above, when a file is stored in a directory corresponding to a specific image forming process such as the directories 2011 and 2012, the compound machine 101 performs the specific image forming process such as printing or facsimile sending. This usage of NFS is possible only by the compound machine 101 that has the image forming functions. Only by performing the simple process of storing a file in a directory, the image forming process (local) can be performed.

When a file is stored in the directory 2013 that is used for storing a file for printing, the compound machine 101 causes an image forming apparatus (printer/compound machine and the like) other than the compound machine 101 to perform a printing process for the file. More specifically, the application 131 (printer application 142 or the SDK application) causes an image forming apparatus to perform the printing process. The file to be stored is an electronic document file, for example.

When a file is stored in the directory 2014 that is used for storing a file for facsimile sending, the compound machine 101 causes an image forming apparatus (facsimile machine/compound machine and the like) other than the compound machine 101 to perform a facsimile sending process for the file. More specifically, the application 131 (facsimile application 142 or the SDK application) causes an image forming apparatus to perform the facsimile sending process. The file to be stored is a scan image file, for example.

As mentioned above, when a file is stored in a directory corresponding to a specific image forming process such as the directories 2013 and 2014, the compound machine 101 causes an image forming apparatus other than the compound machine 101 to perform the specific image forming process such as printing or facsimile sending. This usage of NFS is possible only by the compound machine 101 that has image forming functions by performing distributed processing. Only by performing the simple process of storing a file in a directory, the image forming process (remote) can be performed.

When a file is stored in the directory 2015 used for storing a ftp processing file, the compound machine 101 performs a ftp process such as file transfer and file update by using ftp (file transfer protocol) for the file. The application (network file application 145 or SDK application) performs the ftp process. The file to be stored is an electronic document file for example.

When a file for mail processing is stored in the directory 2016 used for mail processes, the compound machine 101 performs a mail process for the file. In the mail process, for example, a mail with the file as an attached file is sent. The application (network file application 145 or SDK application) performs the facsimile sending processing.

As mentioned above, when a file is stored in a directory corresponding a specific communication process such as the directories 2015 and 2016, the compound machine 101 performs the specific image forming process such as the ftp process or the mail process. This usage of NFS is possible only by the compound machine 101 that has advanced communication functions equivalent to communication functions of a PC. Only by performing the simple process of storing a file in a directory, advanced communication processes can be performed.

(2) Directory 2011 for Print Processing

In the following, the directory 2011 for the print process is described in detail.

FIG. 29 shows a sequence diagram of the print process. In the compound machine 101, the printer application 142 is launched as a daemon process in step 11, and the printer application 142 searches the directory 2011 at predetermined time intervals (three minutes, for example) in step 12. When a file is found in the directory 2011, the printer application 142 generates a RAW file (file used for an image forming process) from the file by using the MCS 165 in step 13. Next, a print request for the RAW file is sent from the printer application 142 to the ECS 164 in step 14. Then, the ECS 164 performs a print process using the RAW file in step 15, and a print response for the RAW file is sent from the ECS 164 to the printer application 142 in step 16. Next, the printer application 142 deletes the RAW file by using the MCS 165 in step 17.

(3) Directory 2012 for a Facsimile Sending Process

In the following, the directory 2012 for the facsimile sending process is described in detail. FIG. 30 is a sequence diagram for the facsimile sending process. In the compound machine 101, the facsimile application 144 is launched as a daemon process in step 21, and the facsimile application 144 searches the directory 2012 at predetermined time intervals (three minutes, for example) in step 22. When a file is found in the directory 2012, the facsimile application 144 generates a RAW file (file used for an image forming process) from the file by using the MCS 165 in step 23. Next, a facsimile sending request for the RAW file is sent from the facsimile application 144 to the FCS 162 in step 24. Then, the FCS 162 performs a facsimile sending process using the RAW file in step 25, and a facsimile sending response for the RAW file is sent from the FCS 162 to the facsimile application 144 in step 26. Next, the facsimile application 144 deletes the RAW file by using the MCS 165 in step 27.

In the following, a facsimile sending destination of the facsimile sending process is described. In the directory 2012 for the facsimile sending process, a directory "03-1234-5678" exists as shown in the path name "B1" in FIG. 28. When a file is stored in the directory "03-1234-5678", the compound machine 101 starts to perform facsimile sending process to send the file data to a facsimile telephone number "03-1234-5678". As mentioned above, when a file is stored in the directory that corresponds to a facsimile sending process for sending a facsimile to a predetermined facsimile sending destination, the compound machine 101 performs the facsimile sending process to send the file data to the predetermined facsimile sending destination. Information of the facsimile sending destination is obtained in step 22 and passed to the FCS 162 in step 24 and used in step 25.

(4) Directory 2013 for a Print Process

In the following, a directory 2013 for a print process is described in detail.

FIG. 31 is a sequence diagram of the print process. In the compound machine 101, the printer application 142 is launched as a daemon process in step 31, and the printer application 142 searches the directory 2013 at predetermined time intervals (three minutes, for example) in step 32. When a file is found in the directory 2013, the printer application 142 sends the file and a print job execution request to an image forming apparatus 2031 other than the compound machine 101 by using the NCS 161 in steps 33 and 34. In response to that, the image forming apparatus 2031 performs the print job for the file in step 35.

In the following, the destination for sending the print job execution request is described. In the directory for the print process, a directory "192.168.0.2" exists as shown in the path name "C1" in FIG. 28. When a file is stored in the directory "192.168.0.2", the compound machine 101 causes the image forming apparatus 2031 having an IP address "192.168.0.2" to print the file. As mentioned above, when a file is stored in a directory corresponding to a print process by a predetermined image forming apparatus, the compound machine 101 causes the predetermined image forming apparatus to perform a print process for the file. Information of the destination for sending the print execution request is obtained in step 32, passed to the NCS 161 in step 33 and is used in step 34.

(5) Directory 2014 for Facsimile Sending Process

In the following, the directory 2014 for the facsimile sending process is described in detail.

FIG. 32 is a sequence diagram of the facsimile sending process. In the compound machine 101, the facsimile application 144 is launched as a daemon process in step 41, and the facsimile application 144 searches the directory 2014 at predetermined time intervals (three minutes, for example) in step 42. When a file is found in the directory 2014, the facsimile application 144 sends the file and a facsimile sending job execution request to an image forming apparatus 2032 other than the compound machine 101 by using the NCS 161 in steps 43 and 44. In response to that, the image forming apparatus 2032 performs the facsimile sending job for the file in step 45.

In the following, the destination for sending the facsimile sending job execution request is described. In the directory 2014 for the facsimile sending process, a directory "192.168.0.2/03-1234-5678" exists as shown in the path name "D1" in FIG. 28. When a file is stored in the directory "192.168.0.2/03-1234-5678", the compound machine 101 causes the image forming apparatus 2032 having an IP address "192.168.0.2" to send a facsimile to a facsimile telephone number "03-1234-5678". As mentioned above, when a file is stored in a directory corresponding to a facsimile sending process by a predetermined image forming apparatus, the compound machine 101 causes the predetermined image forming apparatus to perform the facsimile sending process for the file. Information of the destination for sending the facsimile sending process execution request is obtained in step 42, passed to the image forming apparatus 2032 in steps 43 and 44 and is used in step 45.

(6) Directory 2015 for a ftp Process

In the following, the directory 2015 for the ftp process is described in detail.

In the directory 2015, a directory "192.168.0.2/put" exists as shown in the path name "E1" in FIG. 28. When a file is stored in the directory "192.168.0.2/put", the compound machine 101 sends the file to a ftp server having an IP address "192.168.0.2". In the directory 2015, a directory "ftp.ricoh.co.jp/put" exists as shown in the path name "E3" in FIG. 28. When a file is stored in the directory "ftp.ricoh.co.jp/put", the compound machine 101 sends the file to a ftp server having a domain name "ftp.ricoh.co.jp". As mentioned above, when a file is stored in the directory corresponding to the file transfer process for transferring the file to a predetermined destination, the compound machine 101 performs a file transfer process to send the file to the predetermined destination. Information of the file transferring destination is obtained in step 52 and is used in step 53 in FIG. 33.

In the directory 2015, a directory "192.168.0.2/get" exists as shown in the path name "E2" in FIG. 28. When a file is stored in the directory "192.168.0.2/get", the compound machine 101 updates the file by obtaining a file from a ftp server having an IP address "192.168.0.2". In the directory 2015, a directory "ftp.ricoh.co.jp/get" exists as shown in the path name "E4" in FIG. 28. When a file is stored in the directory "ftp.ricoh.co.jp/get", the compound machine 101 updates the file by obtaining a file from a ftp server having a domain name "ftp.ricoh.co.jp". As mentioned above, when a file is stored in the directory corresponding to the file obtaining process for obtaining the file from a predetermined destination, the compound machine 101 performs the file updating process based on the file obtaining process. Information of the file obtaining source is obtained in step 62 and is used in step 63 in FIG. 34.

FIG. 33 is a sequence diagram of the file transfer process. In the compound machine 101, the network file application 145 is launched as a daemon process in step 51, and the network file application 145 searches the directory 2015 at predetermined time intervals (three minutes, for example) in step 52. When a file is found in a put directory in the directory 2015, the network file application 145 sends the file to an ftp server 2041 by using the NCS 161 in step 53.

FIG. 34 is a sequence diagram of the file update process. In the compound machine 101, the network file application 145 is launched as a daemon process in step 61, and the network file application 145 searches the directory 2015 at predetermined time intervals (three minutes, for example) in step 62. When a file is found in a get directory in the directory 2015, the network file application 145 performs the file obtaining process to obtain a file same as the found file from the ftp server 2041 by using the NCS 161 in step 63, and the network file application 145 performs the file update process to update the original file with the obtained file in step 64.

(7) Directory 2016 for Mail Processing

In the following, the directory 2016 for a mail process is described in detail.

In the directory 2016 for the mail process, a directory "admin@ricoh.co.jp" exists as shown in the path name "F1" in FIG. 28. When a file is stored in the directory "admin@ricoh.co.jp", the compound machine 101 performs a mail delivering process to send a mail to which the file is attached as an attached file to a mail server of the mail address "admin@ricoh.co.jp". As mentioned above, when a file is stored in the directory for the mail delivering process to a predetermined destination, the compound machine 101 performs the mail delivering process to send a mail to which the file is attached as an attached file to the predetermined destination. Information of the mail delivering destination is obtained in step 72 and is used in step 73 in FIG. 35.

FIG. 35 is a sequence diagram of the mail delivering process. In the compound machine 101, the network file application 145 is launched as a daemon process in step 71, and the network file application 145 searches the directory 2016 at predetermined time intervals (three minutes, for example) in step 72. When a file is found in the directory 2016, the network file application 145 performs the mail delivering process to deliver the mail to which the file is attached as the attached file to a mail server 2042 by using the NCS 161 in step 73.

(8) Cron

In the processes shown in the figures such as FIG. 29 for example, the printer application 142 and the like is launched and a directory is searched by the printer application 142. Alternatively, the directory may be searched by a cron function of UNIX. In this case, the printer application 142 and the like is launched after the file is searched by the cron function of UNIX. The time interval at which the search process is executed may be set via a Web page provided by the compound machine 101. In this embodiment, the application (131) is an example of the information processing program of the present invention, and an SD memory card or a CD-ROM storing the application 131 is an example of the recording medium of the present invention. The compound machine 101 is an example of the image forming apparatus of the present invention and the information processing performed in the compound machine 101 is an example of the information processing method of the present invention.

The present invention is not limited to the specifically disclosed embodiments, and variations and modifications may be made without departing from the scope of the present invention.

The present application contains subject matter related to Japanese patent application No. 2003-203078, filed in the JPO on Jul. 29, 2003, Japanese patent application No. 2004-213188, filed in the JPO on Jul. 21, 2004, Japanese patent application No. 2004-213189, filed in the JPO on Jul. 21, 2004, Japanese patent application No. 2004-213190, filed in the JPO on Jul. 21, 2004, the entire contents of which being incorporated herein by reference. The present application is also a continuation application of U.S. patent application Ser. No. 10/900,098, filed on Jul. 28, 2004.

What is claimed is:

1. An information processing system comprising:
a first information processing apparatus configured to perform a first information processing;
a second information processing apparatus having a plurality of output destinations, and configured to perform a second information processing;
a data storage portion in the second information processing apparatus that can receive and store data from the first information processing apparatus, the data storage portion including a plurality of data storing parts, each of which corresponds to a specific second information processing process and wherein some of the plurality of data storing parts correspond to said output destinations;
a processing portion in the second information processing apparatus, the processing portion being configured to perform the specific second information processing when the data from the first information processing apparatus is received and stored by one of the data storing parts, the specific second information processing comprising determining if the one of the data storing parts corresponds to one of said output destinations, determining second information in the one of the data storing parts that is associated with the one of said output destinations, and outputting data to the one of said output destinations according to the second information.

2. The information processing system according to claim 1 wherein the second information processing apparatus is an image forming apparatus.

3. The information processing system according to claim 2 wherein the data storage portion comprises a file system.

4. The information processing system according to claim 3 wherein the plurality of data storing parts comprise a plurality of file directories.

5. An information processing method comprising the steps of:
performing a first information processing in a first information processing apparatus;
sending data from the first information processing apparatus to a second information processing apparatus having a plurality of output destinations, and a data storage portion including a plurality of data storing parts, each of which corresponds to a specific second information processing process, wherein some of the plurality of data storing parts correspond to said output destinations;
performing the specific second information processing when the data from the first information processing apparatus is received and stored by one of the data storing parts, the specific second information processing comprising determining if the one of the data storing parts corresponds to one of said output destinations, determining second information in the one of the data storing parts that is associated with the one of said output destinations, and outputting data to the one of said output destinations according to the second information.

6. The information processing method according to claim 5 wherein the specific second information processing is an image forming process.

7. The information processing method according to claim 6 wherein the second information processing apparatus performs the specific second information processing corresponding to a selected one of the plurality of data storing parts using an application program.

8. An information processing system comprising:

an information processing apparatus configured to perform information processing;

a data storage portion in the information processing apparatus that can receive and store data from another information processing apparatus, the data storage portion including a plurality of output destinations, and a plurality of data storing parts, each of which corresponds to a specific information processing process and wherein some of the plurality of data storing parts correspond to said output destinations;

a processing portion in the information processing apparatus, the processing portion being configured to perform the specific information processing when the data from the first information processing apparatus is received and stored by one of the data storing parts, the specific second information processing comprising determining if the one of the data storing parts corresponds to one of said output destinations, determining second information in the one of the data storing parts that is associated with the one of said output destinations, and outputting data to the one of said output destinations according to the second information.

9. The information processing system according to claim 8 wherein the information processing apparatus is an image forming apparatus.

10. The information processing system according to claim 9 wherein the data storage portion comprises a file system.

11. The information processing system according to claim 10 wherein the plurality of data storing parts comprise a plurality of file directories.

12. A non-transitory computer readable medium storing an information processing program for causing an image forming apparatus to perform information processing, comprising:

first information processing means for performing a first information processing in a first information processing apparatus;

data sending means for sending data from the first information processing apparatus to a second information processing apparatus having a plurality of output destinations, and a data storage portion including a plurality of data storing parts, each of which corresponds to a specific second information processing process, wherein some of the plurality of data storing parts correspond to said output destinations;

second information processing means for performing the specific second information processing process when the data from the first information processing apparatus is received and stored by one of the data storing parts, the specific second information processing comprising determining if the one of the data storing parts corresponds to one of said output destinations, determining second information in the one of the data storing parts that is associated with the one of said output destinations, and outputting data to the one of said output destinations according to the second information.

* * * * *